(12) United States Patent
Zhang

(10) Patent No.: US 6,252,879 B1
(45) Date of Patent: Jun. 26, 2001

(54) SINGLE COUNTER FOR CONTROLLING MULTIPLE FINITE STATE MACHINES IN A MULTI-PORT BRIDGE FOR LOCAL AREA NETWORK

(75) Inventor: Erica Zhang, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/078,412

(22) Filed: May 13, 1998

Related U.S. Application Data
(60) Provisional application No. 60/059,171, filed on Sep. 17, 1997.

(51) Int. Cl.$^7$ ................................................. H04L 12/28
(52) U.S. Cl. ........................................... 370/401; 709/228
(58) Field of Search ..................... 370/479, 466, 370/400, 402, 401, 239, 395, 404, 403, 331, 338, 436, 456, 452, 240, 407, 446, 502; 709/242, 149, 223, 243, 227–229, 238, 222; 375/241, 272, 295

(56) References Cited

U.S. PATENT DOCUMENTS

| | | | |
|---|---|---|---|
| 5,517,494 | 5/1996 | Green | 370/60 |
| 5,559,796 | 9/1996 | Edem et al. | 370/60 |
| 5,680,622 | 10/1997 | Even | 395/709 |
| 5,764,895 | 6/1998 | Chung | 395/700.8 |
| 5,805,816 | 9/1998 | Picazo, Jr. et al. | 395/200.53 |
| 5,852,607 | 12/1998 | Chin | 370/401 |
| 5,857,075 | 1/1999 | Chung | 395/200.53 |
| 5,859,837 | 1/1999 | Crayford | 370/230 |
| 5,878,028 | 3/1999 | Roy et al. | 370/235 |
| 5,884,040 | 3/1999 | Chung | 395/200.57 |
| 5,923,660 | 7/1999 | Shemla et al. | 370/402 |
| 5,926,473 | 7/1999 | Gridley | 370/389 |
| 5,940,597 | 8/1999 | Chung | 395/200.72 |
| 5,991,305 | 11/1999 | Simmons et al. | 370/422 |
| 6,044,080 | 3/2000 | Antonov | 370/401 |
| 6,067,300 | 5/2000 | Baumert et al. | 370/413 |
| 6,070,205 | 5/2000 | Kato et al. | 710/100 |
| 6,075,773 | 6/2000 | Clark et al. | 370/241 |
| 6,081,532 | 6/2000 | Fiammante | 370/401 |
| 6,084,877 | 7/2000 | Egbert et al. | 370/389 |
| 6,088,356 | 7/2000 | Hendel et al. | 370/392 |
| 6,094,434 | 7/2000 | Kotzur et al. | 370/401 |
| 6,098,110 | 8/2000 | Witkowski et al. | 709/249 |
| 6,108,345 | 8/2000 | Zhang | 370/445 |
| 6,111,874 | 8/2000 | Kerstein | 370/389 |
| 6,122,277 | 9/2000 | Garmire et al. | 370/390 |
| 6,130,891 | 10/2000 | Lam et al. | 370/401 |

Primary Examiner—Wellington Chin
Assistant Examiner—Prenell Jones
(74) Attorney, Agent, or Firm—Haverstock & Owens LLP

(57) ABSTRACT

A multi-port bridge includes a plurality of ports interconnected by a communication bus. A memory device, utilized for temporarily storing packets to be bridged by the multi-port bridge, is accessed by each port via the communication bus. A memory pointer for each packet to be transmitted by a port is stored in a memory pointer buffer within the port. The memory pointer includes an address assigned to the packet in the memory device. Each port includes: a first finite state machine (transmit FSM) which controls retrieving packets from the memory device and transmitting the packets to the network segment associated with the port; a second FSM (memory pointer FSM) which controls receiving memory pointers from the communication bus and storing the memory pointers in the memory pointer buffer; and a third FSM (receive FSM) which controls receiving packets from the network segment associated with the port and storing the packets in the memory device. Each FSM requires a set of registers, including a counter for keeping track of the current state of the FSM and registers for storing parameters utilized by the FSM. At any time, none, one, two or all of the FSMs in a port can be active. At least one register is identified that is used only in certain states in each of the FSMs such that no more than one FSM requires use of this register at the same time. Accordingly, each of the three FSMs share at least one register.

27 Claims, 11 Drawing Sheets

SINGLE COUNTER FOR CONTROLLING MULTIPLE FINITE STATE MACHINES IN A MULTI-PORT BRIDGE FOR LOCAL AREA NETWORK

This application claims the benefit of U.S. Provisional Application No. 60/059,171, filed Sep. 17, 1997, entitled, "MULTI-PORT BRIDGE FOR A LOCAL AREA NETWORK."

FIELD OF THE INVENTION

The invention relates to a multi-port bridge for a local area network. More particularly, the invention relates to a single counter for controlling multiple finite state machines in a multi-port bridge for a local area network.

BACKGROUND OF THE INVENTION

Nodes of a local area network (LAN) are typically interconnected by a shared transmission medium. The amount of data traffic that the shared transmission medium can accommodate, however, is limited. For example, only one node at a time can successfully transmit data to another node over the shared transmission medium. If two or more nodes simultaneously attempt to transmit data, a data collision occurs, which tends to corrupt the data being transmitted. Thus, nodes that share a transmission medium are considered to be in a same collision domain.

A multi-port bridge allows simultaneous communication between nodes of the LAN by segmenting the LAN into multiple collision domains (also referred to as network segments), each segment having a corresponding transmission medium. FIG. 1 illustrates a conventional local area network (LAN) including a multi-port bridge 20. The multi-port bridge 20 in this example has eight ports A-H, though the number of ports can vary. Each port A-H is connected to a segment 21–28 of the LAN. Each segment 21–28 typically includes one or more nodes 29–44, such as a workstation, a personal computer, a data terminal, a file server, a printer, a facsimile, a scanner or other conventional digital device. Each of the nodes 29–44 has an associated node address which uniquely identifies the node. The nodes 29–44 are configured to send data, one to another.

When the LAN operates according to Ethernet standards, such as the Institute of Electrical and Electronics Engineers (IEEE) 802.3 standard, data is communicated in the form of discrete packets. FIG. 2 illustrates a conventional IEEE 802.3 data packet 50. The data packet 50 has an eight byte long pre-amble 51 which is generally utilized for synchronizing a receiver to the data packet 50. The pre-amble 51 includes seven bytes of pre-amble and one bite of start-of-frame. Following the pre-amble 51, the data packet 50 includes a six byte long destination address 52, which is the node address of a node which is an intended recipient for the data packet 50. Next, the data packet 50 includes a six byte long source address 53, which is the node address of a node which originated the data packet 50. Then, following the source address 53 is a two-byte data type field 54. Following the data type field 54 is a data field 55. The data field 55 can be up to 1500 bytes long. In addition, the packet can include a two-byte length field between the source address 53 and data type field 54. Finally, the data packet 50 includes a four-byte frame check field 56 which allows a recipient of the data packet 50 to determine whether an error has occurred during transmission of the data packet 50.

When a node (source node) sends data to another node (destination node) located on its same segment of the LAN (intra-segment communication), the data is communicated directly between the nodes without intervention by the multi-port bridge 20 and is known as an intra-segment packet. Therefore, when the multi-port bridge 20 receives an intra-segment packet, the multi-port bridge 20 does not bridge the packet (the packet is filtered). When a node (source node) sends a data packet to another node (destination node) located on a different segment (inter-segment communication), the multi-port bridge 20 appropriately forwards the data packet to the destination node.

Accordingly, each port A-H of the multi-port bridge 20 receives packets from the network segment associated with the port, forwards the packets that are to be transmitted by another port, and also transmits packets to the network segment associated with the port. To achieve each of these functions, each port conventionally includes relatively complex circuitry, such as a micro-processor and its associated circuitry. This tends to result in production costs for such a multi-port bridge 20 that are higher than desired and also tends to result in the performance and reliability of the multi-port bridge 20 being lower than desired. Because the multi-port bridge 20 includes a plurality of ports, the complexity of each port is multiplied by the number of ports, thereby, exacerbating these problems.

Therefore, what is needed is improved technique for reducing the complexity of the ports in a multi-port bridge. Preferably, such an improved technique would enhance, rather than sacrifice, functionality and performance of the ports.

SUMMARY OF THE INVENTION

The invention is a technique for achieving a single counter in each port of a multi-port bridge for a local area network where the single counter is utilized for controlling multiple finite state machines in the port. The multi-port bridge includes a switch engine, a memory and a plurality of ports, all of which are interconnected by a high speed communication bus. The switch engine includes a bus controller, a memory controller and a look-up controller, each preferably being a finite state machine. The memory controller provides an interface between the memory and the communication bus. The bus controller controls access to the communication bus by collecting requests and granting the requests in an appropriate priority. The look-up controller determines to which port each packet is to be directed based upon the destination node address for the packet.

The high speed communication bus includes bit lines dedicated to communicating control commands, bit-lines dedicated to communicating data, and several bit-lines having special purposes. For example, two bit-lines are preferably dedicated to initiating access to the bus, each having a respective priority, another bit-line is dedicated to jam requests (for applying backpressure), still another bit-line is dedicated to the memory controller and yet another bit-line is dedicated to providing a bus clock signal. The memory includes look-up tables utilized for appropriately directing data packets among the ports, packet buffers utilized for temporarily storing packets and mailboxes for providing an interface between the switch engine and an external processor.

Each port includes a port controller having a memory pointer finite state machine (FSM), a MAC transceiver, receive FSM, a transmit FSM, a receive buffer, a transmit buffer and a memory pointer buffer. Packets received from a LAN segment by the transceiver are directed to the communication bus through the receive buffer, while packets to be transmitted over the LAN segment are directed to the transceiver through the transmit buffer. The memory pointer buffer stores memory pointers in a queue for transmission by the port, one memory pointer for each data packet being stored in the packet buffers of the memory. The memory pointer includes an address assigned to the packet in the memory.

Each of the transmit FSM, memory pointer FSM and receive FSM requires a set of registers, such as a counter for keeping track of the current state of the FSM and registers for storing parameters utilized by the FSM. At any time, none, one, two or all of the FSMs in a port can be active. At least one register is identified that is used only in certain states in each of the FSMs such that no more than one FSM requires use of this register at the same time. This register, therefore, is shared by multiple FSMs, though preferably more than one register is shared in this manner.

An advantage of this technique of the present invention is that it reduces the number of registers required for each port, thus, reducing the cost of producing the multi-port bridge. Because the multi-port bridge according to the present invention preferably has twenty-six ports, the advantages are substantial.

DETAILED DESCRIPTION OF A PREFERRED EMBODIMENT

The following documents are hereby incorporated by reference: U.S. patent application Ser. No. 08/590,125, filed Jan. 23, 1996; U.S. patent application Ser. No. 08/371,499, filed Jan. 11, 1995; U.S. patent application Ser. No. 08/947, 081, filed Oct. 8, 1997; U.S. patent application Ser. No. 08/946,866, filed Oct. 8, 1997; U.S. patent application Ser. No. 09/025,356, filed Feb. 18, 1998, and entitled, "HIGH SPEED BUS STRUCTURE IN A MULTI-PORT BRIDGE FOR A LOCAL AREA NETWORK"; and U.S. patent application Ser. No. 09/025,355, filed Feb. 18, 1998, and entitled, "MEMORY CONTROLLER IN A MULTI-PORT BRIDGE FOR A LOCAL AREA NETWORK".

Figure 1:
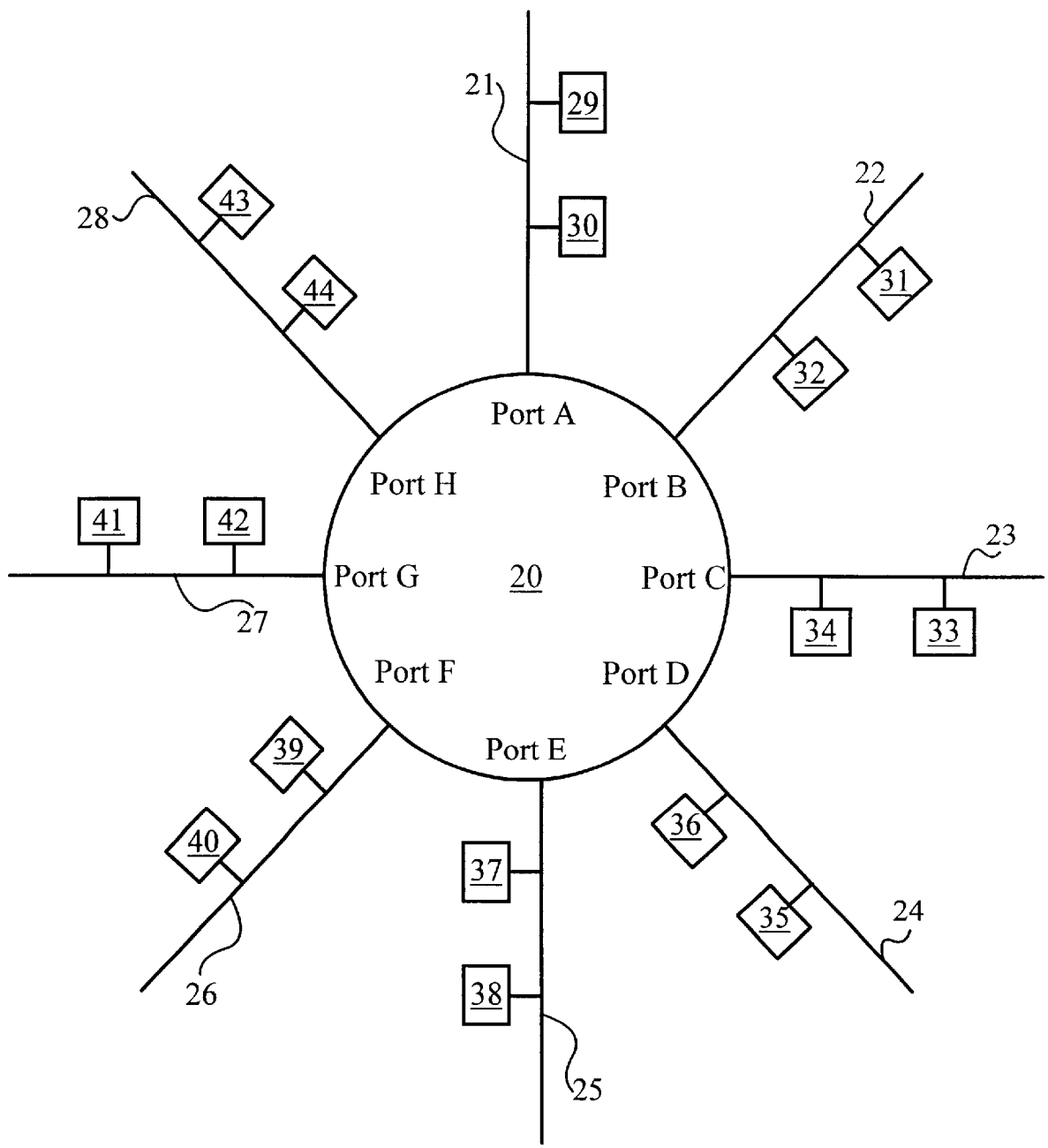
FIG. 1 illustrates a conventional local area network (LAN) including a multi-port bridge.
Figure 2:
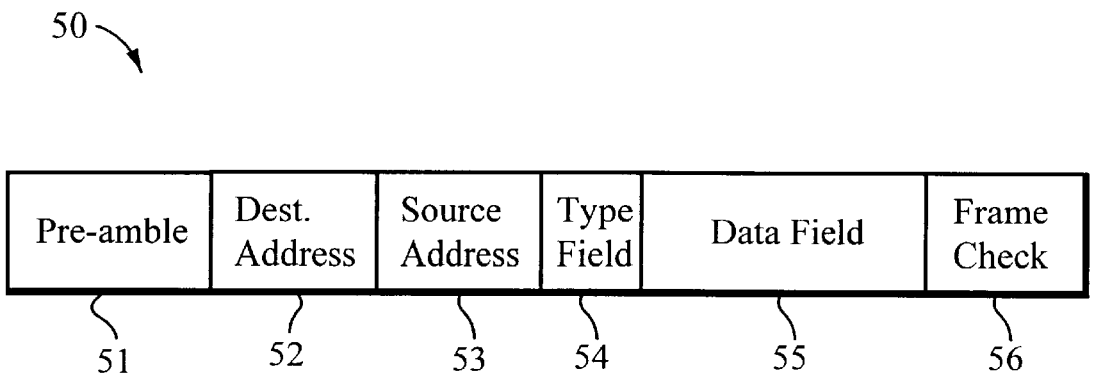
FIG. 2 illustrates a conventional IEEE 802.3 data packet.
Figure 3:
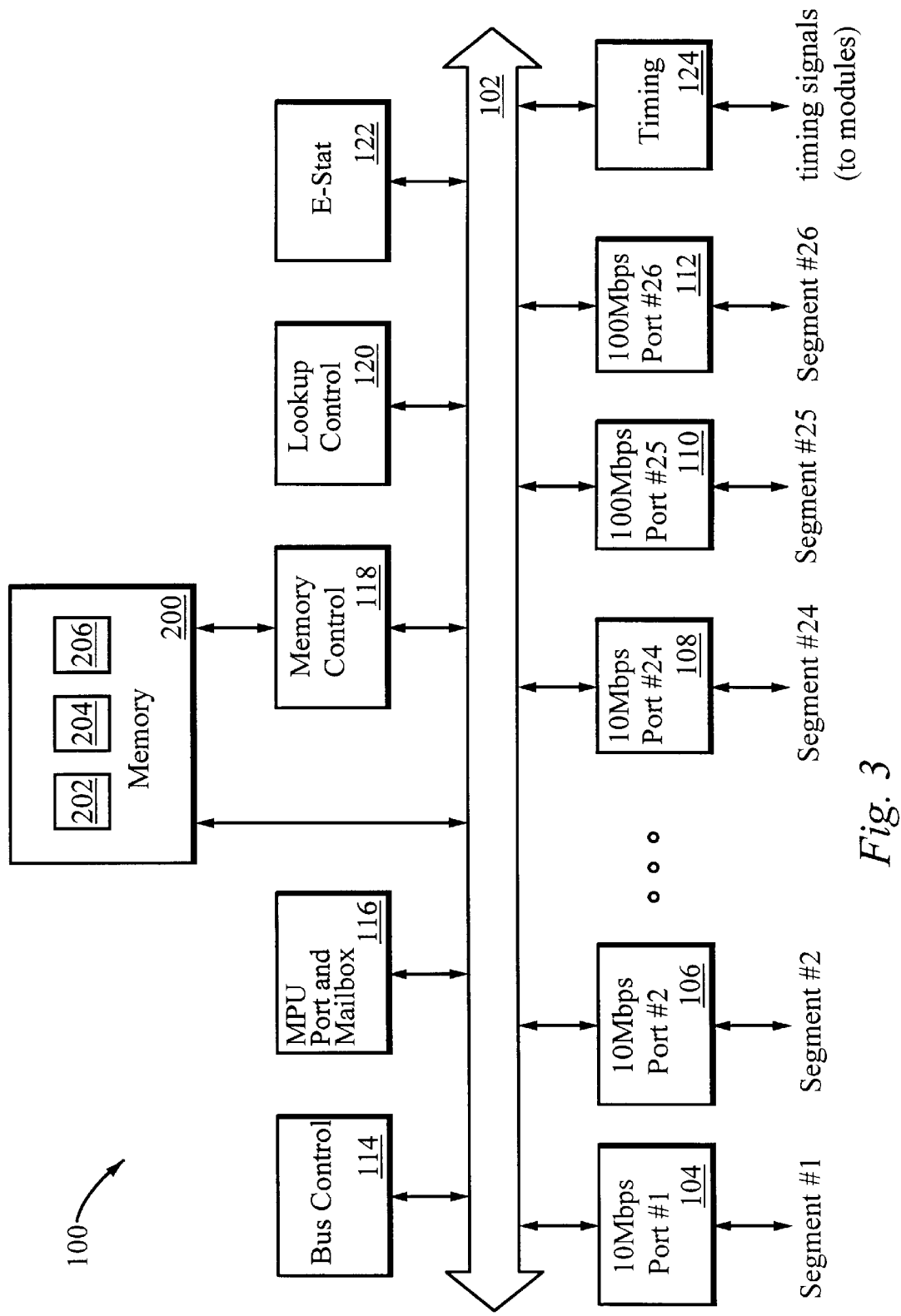
FIG. 3 illustrates a block schematic diagram of a multi-port bridge according to the present invention.

FIG. 3 illustrates a block schematic diagram of a multi-port bridge 100 according to the present invention. A high speed communication bus 102 provides an interconnection for each of the functional blocks 104–124 of the multi-port bridge 100. According to the preferred embodiment, twenty-four 10 Mbps ports 104–108 and two 100 Mbps ports 110–112 are each coupled to the communication bus 102 and can be coupled to a respective LAN segment, each LAN segment having one or more nodes. Each of the twenty-four 10 Mbps ports 104–108 transmit and receive data packets at a rate of 10 Mbps, whereas, the two 100 Mbps ports 110–112 transmit and receive data packets at a rate of 100 Mbps. It will be apparent, however, that other numbers of ports, other port configurations and other performance characteristics can be utilized.

A bus control module 114 controls access to the communication bus 102 by collecting requests from the ports 104–112 and from the other modules. Based upon the requests, the bus control module 114 grants access to the communication bus 102 according to an appropriate priority, as explained herein. The bus control module 114 also controls access to a memory device 200 by the external processor 400 (FIG. 10), as explained herein. An MPU port and mailbox module 116 provides an interface between the multi-port bridge 100 and the external processor 400 for performing various functions, as is also explained herein. These functions include loading data into registers of the multi-port bridge 100, reading data from registers of the multi-port bridge 100 and transferring data packets between the external processor 400 and the ports 104–112 of the multi-port bridge 100.

A memory control module 118 provides an interface between the memory device 200 and the communication bus 102 and also provides an interface between the memory device 200 and a look-up control module 120. The memory device 200 includes mailboxes 202 for exchanging information between the external processor 400 and the multi-port bridge 100. In addition, the memory device includes look-up tables 204. The look-up tables 204 include entries which indicate which port of the multi-port bridge 100 is associated with each node of the LAN and also include group addresses for multi-cast packets. The look-up tables 204 are utilized for appropriately directing among the ports 104–112 data packets received by the multi-port bridge 100.

The look-up control module 120 receives addresses of nodes and associated port identifications to be stored in the look-up table 204 from the communication bus 102. The look-up control module 120 also facilitates utilizing the look-up table 204 for directing packets among the ports 104–112 based upon the destination address of each packet. The memory device 200 also includes packet buffers 206 for temporarily storing data packets that are being directed through the multi-port bridge. The memory device 200 is preferably an SDRAM device, though other types of memory devices can be utilized, such as DRAM, SRAM, RAM or EDO. In the case of dynamic memory, the memory control module 118 refreshes the memory device 200 as required.

An E-stat module 122 collects data packet routing statistics and provides them to the external processor 400 for performing analysis and network management functions. A timing module 124 provides timing signals to the ports 104–112 and to the other modules 114–122 of the multi-port bridge 100. Preferably, a primary clock signal cycles at 40 MHz. Other clock signals, at 10 MHz and 25 MHz, are derived from the primary clock signal.

Preferably, the modules 114–124 are each implemented as a finite state machine, though one or more of the modules 114–124 can alternately be implemented as one or more processors or controllers operating according to stored software programs. Finite state machines are preferred, however, as they can generally perform the necessary operations faster, thus, resulting in a higher packet handling bandwidth for the multi-port bridge 100.

Figure 4:
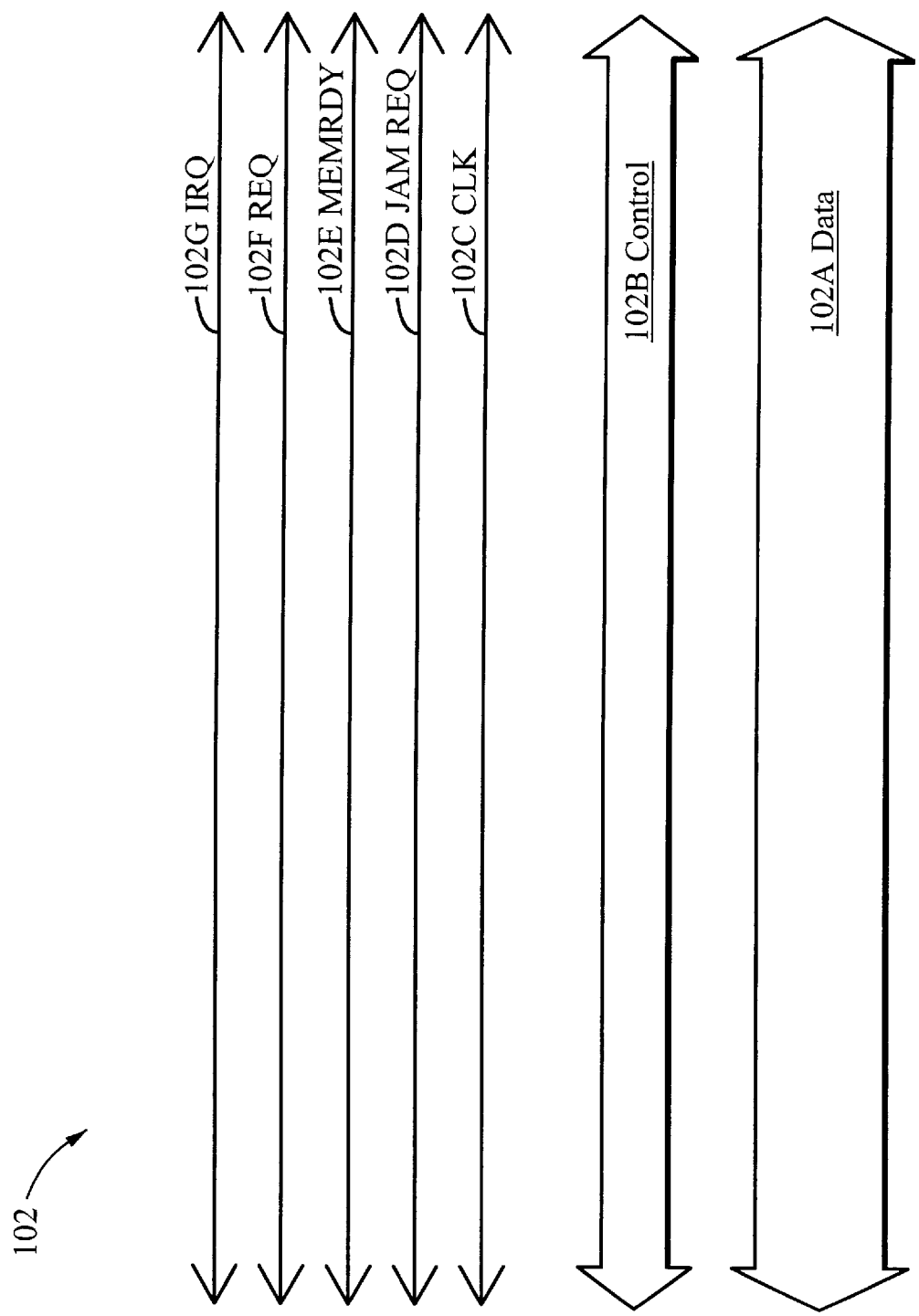
FIG. 4 illustrates a diagram of signal lines included in a high speed communication bus according to the present invention.

FIG. 4 illustrates a diagram of the signal lines included in the high speed communication bus 102 FIG. 3. The communication bus 102 preferably includes thirty-two data lines 102A, five control lines 102B, a clock CLK line 102C, a jam request JAM REQ line 102D, a memory ready MEMRDY line 102E, a request REQ line 102F and an interrupt IRQ line 102G, though it will be apparent that other bus configurations can be utilized.

registers 304, provides control for the port and an interface between the port and the communication bus 102. The port controller 300 monitors the communication bus 102 for commands and data and also provides commands and data to the communication bus 102 at times when the port has control of the communication bus 102. The registers 304 contain data for configuring the port, initializing the port upon start-up, and for collecting status information for the port. The registers 304 also contain a counter for storing a current state of the finite state machine of the port and registers for storing parameters for use by the finite state machines of the port.

Each port also includes a memory pointer FIFO buffer 306 coupled between the communication bus 102 and the port controller 300. The memory pointer buffer 306 stores memory pointers (explained herein) for data packets being queued in the packet buffers 206 (FIG. 3) of the memory device 200. Preferably, the memory pointers each have a predefined length. In addition, the memory pointer buffer 306 preferably holds 128 memory pointers, though it will be apparent that another capacity for the memory pointer buffer 306 can be selected.

The port also includes a medium access control (MAC) transceiver 308 which accesses a LAN segment 310 for

TABLE 1

| Control Code | Data 31–24 | 23–0 | Description |
|---|---|---|---|
| 00 Hex | | | transfer in progress/no action |
| 01 | # of transfer | starting memory address | memory read |
| 02 | # of transfer | starting memory address | memory write |
| 03 | source port ID & dest. and source addresses | | look-up |
| 04 | signal line of port granted access | | bus-grant-for-REQ |
| 05 | signal lines of all interrupting ports | | poll-interrupt |
| 06 | signal lines of all requesting ports | | poll-request |
| 07 | | | reserved |
| 08 | source port ID & bit-map of all dest. ports | | look-up ready |
| 09 | source port ID & dest. and source addresses | | look-up (gated with MEMRDY) |
| 0A | | | reserved |
| 0B | | | reserved |
| 0C | register data | | register load |
| 0D | register data | | register read |
| 0E | | | reserved |
| 0F | last transfer (as previously defined) | | bus-release |
| 10 | source port ID & dest. port ID | | new packet transfer to memory (cut-through possible) |
| 11 | source port ID & dest. port ID | | cont. packet transfer to memory (cut-through not possible) |
| 12 | # of transfer | memory starting address | write packet header to memory |
| 13 | | | reserved |
| 14 | signal line of port granted access | | bus-grant-for-IRQ |

Table 1 illustrates preferred commands and associated data appearing on the communication bus 102 during operation of the multi-port bridge 100, as explained herein. Referring to Table 1, the Control Codes (commands) applied to the control lines 102B are given as hexadecimal values, while the associated data placed on the data lines 102A and the function performed by each command are described. Because there are five control lines 102B, there can be up to thirty-two different commands (between 00 H and 1F H). As shown in Table 1, however, fewer commands are preferred. Table 1 shows hexadecimal values for the preferred embodiment. It will be apparent, however, that other bit assignments and another set of commands can be implemented and still follow the teachings of the present invention.

Figure 5:
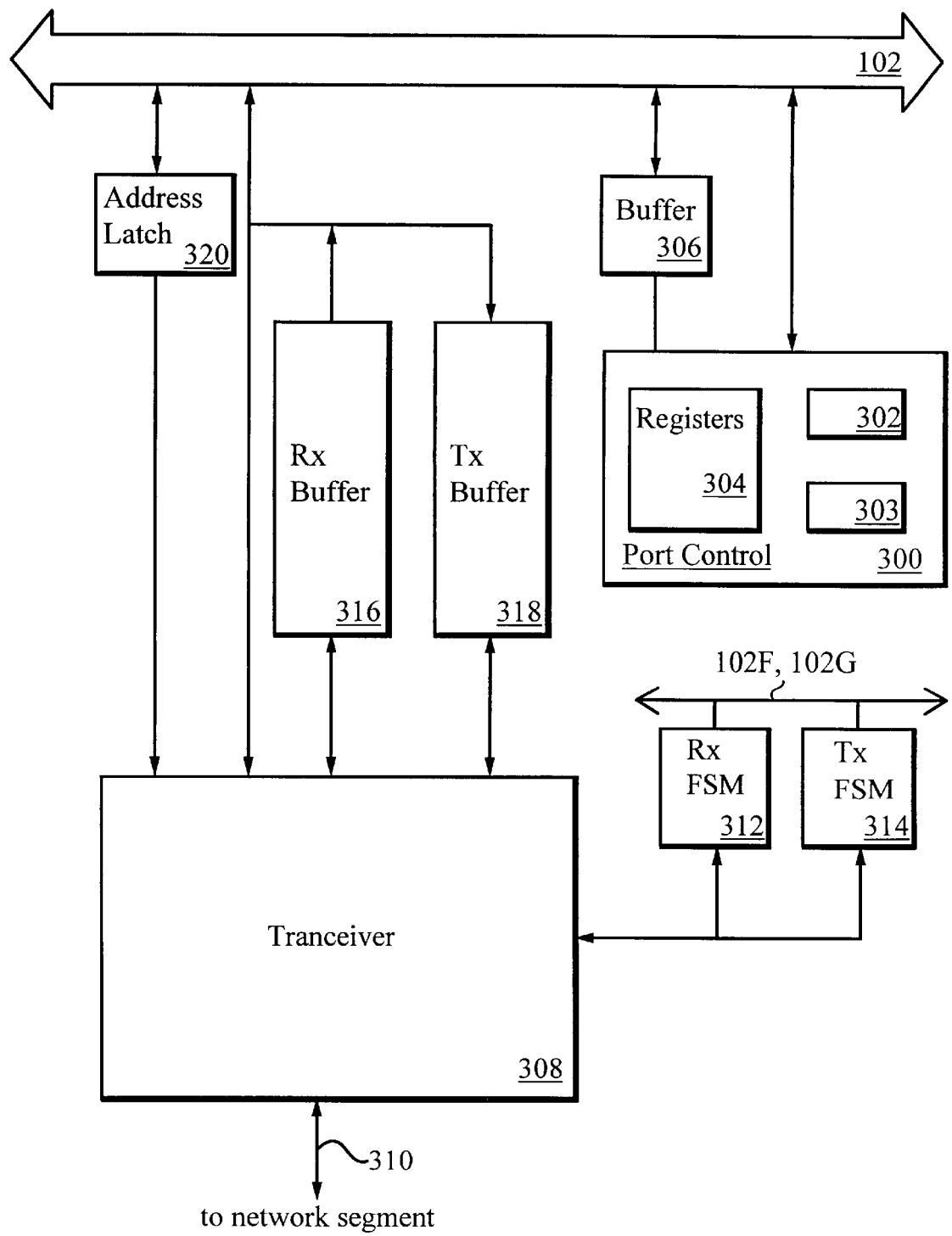
FIG. 5 illustrates a block schematic diagram of a port of the multi-port bridge according to the present invention.

FIG. 5 illustrates a block schematic diagram of one of the ports 104–112 of the multi-port bridge 100 (FIG. 3). A port controller 300, including a bus interface 302, a memory pointer finite state machine (memory pointer FSM) 303 and transmitting and receiving data packets to and from the LAN segment 310. Associated with and coupled to the transceiver 308 are a receive finite state machine (receive FSM) 312, for controlling the transceiver 308 during packet reception, and a transmit finite state machine (transmit FSM) 314, for controlling the transceiver 308 during packet transmission.

Packets received from the network segment 310 by the transceiver 308 are directed to the communication bus 102 through a receive FIFO buffer 316, while packets to be transmitted over the LAN segment 310 are directed from the communication bus 102 to the transceiver 308 through a transmit FIFO buffer 318. Preferably, the receive buffer 316 holds 128 bytes while the transmit buffer 318 holds 256 bytes for a 10 Mbps port and 512 bytes for a 100 Mbps port, though other capacities can be selected. Note that an IEEE 802.3 data packet can include up to 1500 bytes of data in addition to the source address, the destination address and the frame check field (for a total of up to 1518 bytes). Thus, in the preferred embodiment, neither the receive buffer 316, nor the transmit buffer 318 is capable of storing a entire IEEE 802.3 data packet of the maximum size. An address latch 318 is also included in the port for latching addresses from the communication bus 102 and for providing them to the transceiver 308. The receive FSM 312 and the transmit FSM 314 are each coupled to the bus control module 114 (FIG. 3) for initiating access to the communication bus 102 by the port.

Access to the communication bus 102 is obtained in the following manner. The bus control module 114 monitors the interrupt IRQ line 102G and the request REQ line 102F. A port requiring access to the bus 102 raises the IRQ line 102G or the request REQ line 102F, depending upon the circumstances. The bus control module 114 grants access to the bus 102 in an appropriate priority. Preferably, an interrupt IRQ is granted access to the bus 102 according to a higher priority than a request REQ. According to the preferred embodiment, ports having a higher data rate have a higher priority than ports having a lower data rate. For example, the 100 Mbps ports 110–112 have a higher priority than the 10 Mbps ports 104–108. Further, assuming equal data rates, a port serviced more recently has a lower priority than a port serviced less recently. Co-pending application entitled, "Dual Priority Chain for Data Communication Ports in a Multi-Port Bridge for a Local Area Network," filed on the same day as the present application, describes a technique for prioritizing the interrupts (IRQ) and requests (REQ) and is hereby incorporated by reference.

When the bus is available after receiving an interrupt IRQ, the bus control module 114 responds to the interrupt IRQ by placing a poll-interrupt command 05 H (Table 1) on the control lines 102B of the bus 102. While the poll-interrupt command 05 H is on the control lines 102B, each port having a pending interrupt IRQ raises a corresponding one bit-line of the data lines 102A. For this purpose, each of the ports 104–112 and the external micro-processor 400 (FIG. 10) are assigned a respective one bit-line of the data lines 102A. Accordingly, the bus control module 114 discovers which of the ports has a pending interrupt by monitoring the data lines 102A while the poll-interrupt command 05 H is active. The bus control module 114 then grants access to the bus 102 in an appropriate priority by placing a bus-grant-for-IRQ command 14 H (Table 1) on the control lines 102B of the bus 102 and also raises the respective one bit-line of the data lines 102A that corresponds to the port being granted access to the bus 102. Upon being granted access to the bus 102, the designated port then has control of the bus 102.

Similarly, when the bus 102 is available after receiving a request REQ, the bus control module 114 places a poll-request command 06 H (Table 1) on the control lines 102B of the bus 102. While the poll-request command 06 H is on the control lines 102B, each port having a pending request REQ raises its corresponding one bit-line of the data lines 102A. The bus control module 114 discovers which of the ports has a pending request by monitoring the data lines 102A while the poll-request command 06 H is active. The bus control module 114 then grants access to the bus 102 in an appropriate priority by placing a bus-grant-for-REQ command 04 H (Table 1) on the control lines 102B of the bus 102 and also raises the one bit-line of the data lines 102A that corresponds to the port being granted access to the bus 102. Upon being granted access to the bus 102, the designated port then has control of the bus 102.

Packet flow through the multi-port bridge 100 occurs in the following manner. A data packet, such as an IEEE 802.3 data packet, originating from a node (source node) in a segment of the local area network is received by a corresponding one of the ports 104–112 (source port) of the multi-port bridge 100 (FIG. 3). The receive buffer 316 in the source port receives the data packet as the packet is being received by the transceiver 308 in the source port from the network segment associated with the source port. After the first twelve bytes, corresponding to the source address and the destination address for the packet, are received by the source port, the receive FSM 312 requests a look-up cycle from the bus control module 114 (FIG. 3) by raising the interrupt line IRQ. The bus control module 114 monitors such requests, discovers the requesting port(s) via the poll-interrupt command 05 H and grants each request according to an appropriate priority via the bus-grant-for IRQ command 14 H, as explained above.

Upon obtaining access to the bus, the source port places a look-up command 03 H (Table 1) on the control lines 102B. During successive clock cycles while the look-up command 03 H is active, an identification of the source port, the destination node address from the packet and the source node address from the packet are transferred from the source port to the look-up control module 120 (FIG. 3) via the data lines 102A. The source port identification, destination address and source address are transferred over the communication bus 102 in segments that are each four bytes long as this corresponds to the width (32 bits) of the data lines 102A of the communication bus 102. Preferably, this transfer is completed in four clock cycles. It will be apparent, however, that the communication bus 102 can have a different number of data lines, in which case, a different number of bytes can be transferred at a time.

Once the look-up control module 120 has received the source port identification, the destination address and the source address for the packet, the look-up control module 120 so notifies the memory control module 118 (FIG. 3). The memory control module 118 and look-up control module 120 then update the look-up tables 204 (FIG. 3) by ensuring that the source node address for the packet is stored in the look-up tables 204 in association with the source port identification for the packet. This ensures that the look-up tables 204 accurately reflect any changes that may have occurred in the network (this is referred to as a learning cycle). The information stored during the learning cycle is utilized for directing subsequent packets.

Once the learning cycle is complete, the memory control module 118 and the look-up control module 120 utilize the look-up tables 204 to determine which port (destination port) is associated with the destination address for the packet. If the packet is a multi-cast packet (multiple destination ports) or a broadcast packet (all ports except the source port are destination ports), the look-up control module 120 will determine which are the multiple destination ports for the packet. Once the look-up cycle is complete, the look-up control module 120 places a look-up ready command 08 H (Table 1) on the control lines 102B of the bus 102 and, while the look-up ready command 08 H is active, the look-up control module 120 raises the respective bit-lines of the data lines 102A of all the ports which are determined to be destination ports for the packet.

Figure 6:
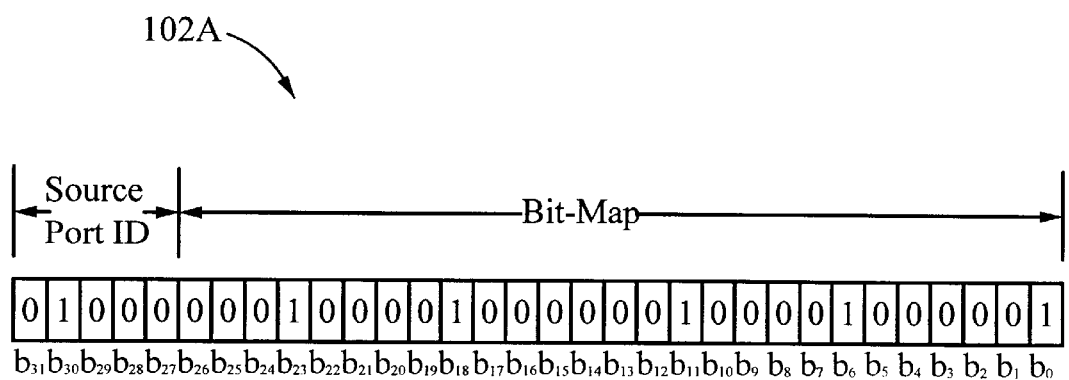
FIG. 6 illustrates a bit-map of the destination ports appearing on the high speed communication bus during a look-up ready command according to the present invention.

This raising of the respective signal lines is referred to as a bit-map of the destination ports. FIG. 6 illustrates logic levels for each of the thirty-two data lines 102A, of the bus 102 during the look-up ready command 08 H. Each one of the twenty-six ports 104–112 and the external processor 400 are assigned to a respective one of the signal lines $b_0$–$b_{31}$.

Thus, for example, the external processor 400 is assigned to signal line $b_{26}$, while port #1 is assigned to signal line $b_0$, port #2 is assigned to signal line bl, port #3 is assigned to signal line $b_2$, and so forth, with port #26 assigned to signal line $b_{25}$. In the preferred embodiment, signal lines $b_{27}$–$b_{31}$ are not included in the bit-map. Rather, the signal lines $b_{27}$–$b_{31}$ identify the source port. A multi-port bridge, however, could include more or fewer ports, in which case, the bit assignments would be different.

Assume that the look-up cycle for a packet having port #9 as its source port determines that the packet is multi-cast having destination nodes associated with destination ports #1, #7, #12, #19 and #24. Therefore, during the look-up ready command 08 H, the bit-map of the destination ports will include logic one's for signal lines $b_0$, $b_6$, $b_{11}$, $b_{18}$ and $b_{23}$; signal lines $b_{27}$–$b_{31}$ identify port #9 as the source port; and the remaining signal lines $b_1$–$b_5$, $b_7$, $b_9$–$b_{10}$, $b_{12}$–$b_{17}$, $b_{19}$–$b_{22}$ and $b_{24}$–$b_{26}$ are logic zeros.

Each port monitors the communication bus 102 for the look-up ready command 08 H appearing on the control lines 102B and the associated bit-map of the destination ports appearing on the data lines 102A. The bit-map allows each destination port for the packet to be simultaneously notified of its status as a destination port. If the source port for the packet is also designated as the only destination port for the packet during the look-up ready command 08 H, this indicates that the destination node for the packet is in the same network segment as the source node (intra-segment communication). As such, the source port should not retransmit the packet because the destination node would have already received the packet at the same time that the source port received the packet. When this occurs and the packet has single destination, the packet is filtered. To filter the packet, the source port preferably takes no further action relative to the packet. Co-pending application entitled, "Selection Method for Preventing a Source Port From Becoming a Destination Port," filed on the same day as the present application, describes a technique for filtering packets and is hereby incorporated by reference.

If any destination port having its bit-line raised during the look-up ready command 08 H has a memory pointer buffer 306 that is full or nearly full, such destination port raises the JAM REQ line 102D (FIG. 4) while the look-up ready command 08 H is still active. During the look-up ready command 08 H, the source port monitors the JAM REQ line 102D for such a jam request. In response to a jam request, the source port discards the incoming packet and also sends a jam signal over its associated segment. The jam signal will cause the node (source node) which is the source of the packet to discontinue sending the packet and attempt to resend the packet after a waiting period.

Once the look-up ready command 08 H is no longer active, the source port for the packet places a bus-release command 0F H (Table 1) on the control lines 102B of the data bus 102. This releases control of the bus 102 by indicating to the bus control module 114 that the bus is available.

The bus control module 114 then responds to any pending interrupts or requests for access to the bus 102 by granting access to the bus in an appropriate priority. Thus, while the packet is still being received by the source port, but after the determination is made whether to filter or jam the incoming packet, the bus 102 can be utilized for other purposes.

Meanwhile, returning the example, the packet continues being received by the source port. Once 64 bytes of the packet have been received, the source port requests access to the bus again, this time by raising the REQ line 102F. The bus control module 114 grants access to the source port in an appropriate priority by placing a bus-grant-for-REQ command 04 H on the control lines 102B and raises the bit-line corresponding to the source port.

The packet buffers 206 include a space allocated to each port for storing packets received by the port. Each port controller 300 keeps track of the space allocated to the port and determines a location in the packet buffers 206 for each packet received by the port. Preferably, the packets are written into the allocated space in a circular fashion; each new packet overwrites portions of the oldest packet in the allocated space.

The source port initiates a series of memory write cycles for loading the packet from the receive buffer 316 of the source port into the allocated space in the packet buffers 206 by first placing a new packet transfer command 10 H (Table 1) on the control lines 102B and by placing the bit-map for the destination ports on the data lines 102A (raising the bit-lines corresponding to each destination port for the packet). If any destination port having its bit-line raised during new packet transfer command 10 H is not currently busy transmitting or receiving another packet, such destination port configures itself to receive the packet directly from the source port (cut-through). Destination ports that are currently busy ignore the packet for now and retrieve the packet from the packet buffers 206 later, when they are no longer busy. In the preferred embodiment, however, the cut-through feature can be selectively enabled/disabled through software control. When cut-though is disabled, the destination port ignores the packet during the new packet transfer command 10 H even if not busy.

Following the new packet transfer command 10 H, the source port places a memory write command 02 H (Table 1) on the control lines 102B of the bus 102. During a first bus clock cycle while the memory write command 02 H is active, the source port places on the data lines 102A one byte of information which indicates the number of bus cycles which will be required to complete the entire transfer. The number of bus cycles depends upon how much of the packet was received in the source port while the source port awaited access to the bus 102. Also during the first bus clock cycle while the memory write command 02 H is active, the source port places on the data lines 102A three bytes of information which indicates a starting address within the packet buffers 206 for the memory write cycles. The memory control module 118 receives this information for performing the memory write operation.

Simultaneously with the writing of the packet into the memory buffers 206, each destination port configured for cut-through receives the packet directly from the bus 102 into its transmit FIFO 318 and immediately begins transmitting the packet to its appropriate destination node on the associated network segment under control of its transmit FSM 314. The destination node for the packet then begins to receive the packet from the network segment.

In subsequent bus clock cycles while the memory write command 02 H is active, the source port places the packet on the data lines 102A in four byte portions (corresponding to the width of the data lines 102A), one portion for each clock cycle, until the memory write operation is completed. Simultaneously, destination ports configured for cut-though continue to receive the packet and continue to transmit the packet to their associated network segment. When the memory write operation is completed, the source port releases the bus via the bus-release command 0F H.

Once the next 64 bytes of the packet is received by the source port, the source port again requests access to the bus 102 by raising the REQ line 102F and initiates a next memory write operation for loading the packet into the packet buffers 206. The source port first places a continuation packet transfer command 11 H (Table 1) on the control lines 102B and, while the continuation packet command 10 H is active, the source port places the bit-map for the destination ports on the data lines 102A (raises the bit-lines corresponding to each destination port for the packet). Only those destination ports having their bit lines raised and that had already been receiving the packet directly from the source port (those destination ports configured for cut-through) will continue to receive the next installment of the packet directly from the source port. Other destination ports will continue to ignore the packet. This is true even if a destination that was busy during the new packet transfer command 10 has become available because such a port would not have obtained the first installment of the packet. Then, the source port places the memory write command 02 on the data lines 102A and places one byte of information indicating the number of bus cycles required and three bytes indicating the starting address for this write operation. Then, the port releases the bus via the bus-release command 0F H. This process repeats, including requesting access to the bus and placing the continuation packet transfer command 10 H on the bus 102, for each successive 64 byte portion of the packet until the entire packet is loaded into the packet buffers 206. Because writing of the packet in the packet buffers 206 preferably occurs as the remainder of the packet is still being received into the receive buffer 316 of the source port, the receive buffer 316 for each port need not be capable of storing an entire data packet.

The packet is preferably loaded into the packet buffers 206 a predetermined offset from an assigned starting address. This provides a location for storing a header for the packet once the packet has been completely loaded into the packet buffers 206. For example, the header includes an identification number assigned to the packet, an indication of the destination ports for the packet, the receive status for the packet, the length of the packet, the source node address for the packet and the destination node address for the packet. The receive status indicates whether or not the entire packet has been successfully received and loaded into the packet buffers 206. Preferably, the header is eight bytes long, though it will be apparent that another length can be selected for the header.

Once the entire packet has been stored in the packer buffers 206, the source port obtains access to the bus 102 and, then, stores the header for the packet in the packet buffers 206 by placing a packet header command 12 H on the control lines 102B. During a first clock cycle while the packet header command 12 H is active, the source port places one byte of information indicating the number of bus clock cycles required to write the entire header into the memory buffers 206 and places three bytes of information indicating the assigned starting address for the packet. During successive bus clock cycles, the header is written into the packet buffers beginning at the assigned starting address.

Each port monitors the communication bus 102 for the packet header command 12 H. While the packet header command 12 H is active, each port receives the packet header information. Each port which is identified as a destination port in the packet header checks the receive status for the packet and, if the packet was successfully received and stored in the packet buffers 306, the destination port stores at least the assigned starting address for the packet in its memory pointer buffer 306. Preferably, the destination port also stores the identification number assigned to the packet in the memory pointer buffer 306 along with the assigned starting address for the packet. If the receive status indicates an error, however, the starting address in the packet buffers is not stored and no further action is taken by the destination ports relative the packet. Finally, the source port releases control of the bus 102 via the bus release command 0F H. This completes the actions taken by the source port relative the packet.

Each port monitors its memory pointer buffer 306 and initiates retrieval of packets from the packet buffers 206. Thus, returning to the example packet, as soon as the destination port becomes available, it removes the identification number for the packet and the assigned starting address for the packet from its memory pointer buffer 306. Then, the destination port requests access to the bus by raising the request line REQ. Once the bus control module grants access to the bus 102, via the bus-grant-for-REQ command 04 H, the destination port first retrieves the header for the packet from the packet buffers 206. Thus, the destination port initiates a read operation by placing a memory read command 01 (Table 1) on the control lines 102B of the bus 102. During a first clock cycle while the memory read command 01 H is active, the destination port places on the data lines 102A of the bus 102 one byte of information indicating the number of bus clock cycles for the read operation (e.g. the number of transfers required to retrieve the header and several bytes of packet data) and three bytes of information indicating the assigned starting address for the packet. In the preferred embodiment, this read operation retrieves two bytes of header and 64 bytes of data.

Once the packet header is retrieved from the packet buffers 206, the destination port checks the packet identification number that is included in the header retrieved. If the packet identification number retrieved from the packet buffers 206 does not match the packet identification number stored in the memory pointer buffer 306, this indicates that the packet became corrupted in the packet buffers 306 after it was stored. For example, if a portion of the packet was overwritten by a later packet, the identification number will also be overwritten, such that it does not match the identification number stored in the memory pointer buffer 306 of the destination port. In addition, the destination port obtains the length of the packet so that it can determine the appropriate number of memory read cycles that will be required to transfer the entire packet. Also, the destination port determines whether an error occurred in the stored packet.

While the destination port is retrieving the packet from the packet buffers 206, the destination port simultaneously transmits the packet to its associated segment under control of the transmit FSM 314. For this reason, the transmit FIFO 318 in each port need not be capable of storing more than a single packet of the maximum length. Preferably, the packet is retrieved from the packet buffers 206 in multiple installments until the entire packet has be retrieved from the packet buffers 206. An installment is initiated each time the transmit FIFO 318 is nearly empty. Each installment is retrieved by the destination port obtaining access to the bus 102; placing a memory read command 01 H on the bus 102 while specifying a number of memory transfers required for the installment; and releasing the bus via the bus release command 0F H after performing the specified number of transfers. Accordingly, the transmit FIFO 318 preferably need not be capable of storing a packet of maximum length. Because the bus 102 is released between installments, other ports can access the bus for other purposes simultaneously with the destination port transmitting the packet to its associated network segment.

In the event that a cut-through or transmit operation was initiated, but was unsuccessful, the packet will need to be retransmitted by the destination port. For example, the cut-through or transmit operation may have been unsuccessful if a data collision occurred during transmission of the packet over the segment associated with the destination port. In such case, the packet is retrieved from the packet buffers 206 as described above and retransmitted by the destination port.

While the destination port is receiving the packet into its transmit buffer 318 from the packet buffers 206, the destination port begins transmitting the packet to the LAN segment associated with the destination port. The packet is then received from the network segment by the destination node for the packet.

Thus, if the destination port is configured for cut-through, the destination port will receive the packet into its transmit buffer 318 directly from the communication bus 102 simultaneously with the write cycles for loading of the packet into the packet buffers 206. During such a cut-through operation, the packet is received into a transmit buffer 318 of the destination port for immediate transmission to the LAN segment associated with the destination port. If the packet is a broadcast or multi-cast packet, one or more of the destination ports can receive the packet directly from the source port, while one or more other destination ports for the packet can retrieve the packet from the packet buffers 206 once those destination ports are no longer busy.

Figure 7:
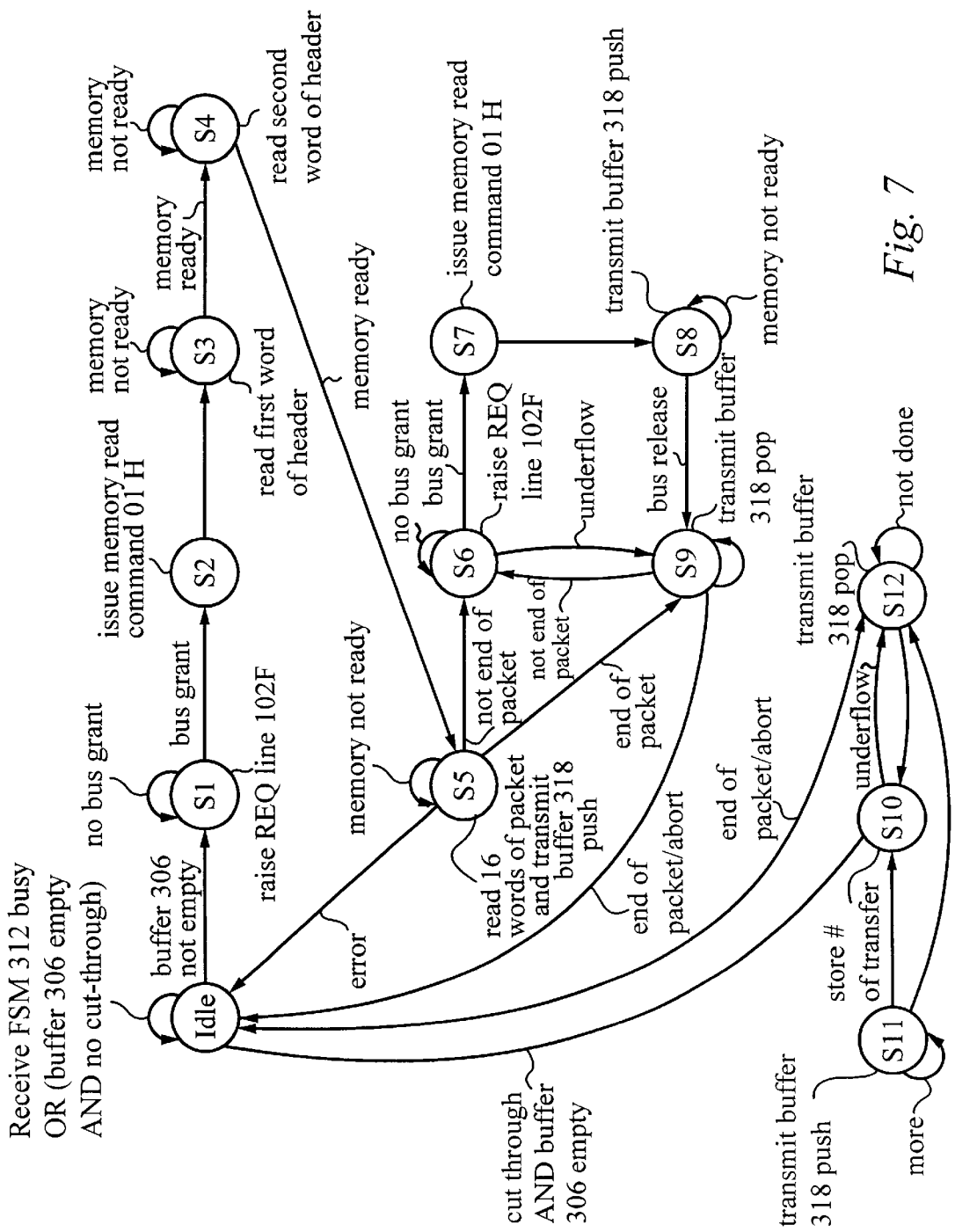
FIG. 7 illustrates a state diagram for a transmit finite state machine (FSM) according to the present invention located in each of the ports.

FIG. 7 illustrates a state diagram for the transmit finite state machine (transmit FSM) 314 (FIG. 5) located in each of the ports 104–112. Initially, the transmit FSM 314 is in an idle state IDLE. The idle state IDLE is maintained so long as the memory pointer buffer 306 for the port is empty and there is no packet that is to be transferred directly to the port from another port (for cut-through). The idle state IDLE is also maintained during periods when the receive FSM 312 (FIGS. 5 and 9) is busy (only during half-duplex operation) as this indicates that a packet is being received by the port.

If the receive FSM 312 is not busy and there is one or more memory pointers in the memory pointer buffer 306, the transmit FSM 314 moves to a state S1. In the state S1, the port requests access to the bus 102 (FIGS. 3–4) by raising the request REQ line 102F (FIG. 4). The transmit FSM 314 remains in the state S1 until the port is notified by the bus control module 114 (FIG. 3), via the bus-grant-for-REQ command 04 H, that control of the bus 102 is granted to the port. Then, the transmit FSM 314 moves to a state S2.

In the state S2, the transmit FSM 314 obtains the memory address for the packet that is to be transmitted. The port controller 300 obtains this address from the memory pointer stored in the memory pointer buffer 306. If more than one memory pointer is in the memory pointer buffer 306, then this address is taken from the memory pointer which was first placed in the memory pointer buffer 306. Also in state S2, the port places a memory read command 01 H on the bus 102. The memory read command 01 H instructs the memory control module 118 (FIG. 3) to retrieve eighteen words (each word is four bytes or thirty-two bits) of data from the packet buffers 206 (FIG. 3) starting at the address taken from the memory pointer and also instructs the memory control module 114 to place this data on the bus 102. From the state S2, the transmit FSM 314 moves to a state S3 where the transmit FSM 314 waits until the first word is ready from the memory controller 118.

The eighteen words requested from the memory controller 118 includes the packet header, which is two words, and the first sixteen words of packet data. Each word is thirty-two bits. Therefore, because the bus 102 includes thirty-two data lines 102A (FIG. 4), eighteen memory cycles are required to transfer all eighteen words requested to the port. The memory ready MEMRDY line 102E is pulsed each time a word is transferred. It will be apparent, however, that another number of words could be requested in the state S2.

Upon receiving the first word of the header in state S3, the first word is stored in an appropriate one of the registers 304. Then, the transmit FSM 314 moves to a state S4 where the transmit FSM 314 waits until the second word is ready from the memory control module 118. Once the second word is received, it is also stored in an appropriate one of the registers 304.

Recall that the header includes an identification number assigned to the packet, an indication of the destination ports for the packet, the receive status for the packet, the length of the packet, the source node address for the packet and the destination node address for the packet. The transmit FSM 314 compares the identification number from the header to the identification number from the memory pointer. If they match, this indicates that the packet was not overwritten by a later packet. If they do not match, this indicates that the packet was overwritten by a later packet. In such case, an error is indicated. In addition, the transmit FSM 314 determines whether the receive status indicates that the packet was successfully received and loaded into the packet buffers 206 (FIG. 3). Assuming no error is detected in comparing the packet identification or reading the packet status, the transmit FSM 314 also separates the destination and source addresses for the packet from the header and loads (pushes) the destination address, and then the source address, into the transmit buffer 318 (FIG. 5) in the port. The transmit FSM 314 also stores the length of the packet in one of the registers 304 for later use.

Then, the transmit FSM 314 moves to a state S5. In the state S5, the first sixteen words of the packet are received by the port. One word is received each time the memory ready MEMRDY line 102E is pulsed. The first sixteen words of the packet are preferably received whether or not an error was detected from the header. This is because these sixteen words were requested in the state S2 when the memory read operation was initiated. No provision is made for halting this memory read operation. Once the sixteen words are received, the port releases the bus 102 by issuing a bus release command 0F H. Then, if an error was detected by reading the header for the packet, the transmit FSM 314 aborts retrieving any more of the packet by returning to the idle state IDLE from the state S5. If no error was detected, the transmit FSM 314 loads (pushes) the first sixteen words of the packet into the transmit buffer 318.

If the data portion of the packet is equal to or smaller than sixteen words, the transmit FSM 314 moves from the state S5 to a state S9. In the state S9, the contents of the transmit buffer 318 are removed (popped) and transferred to the MAC transceiver 308 (FIG. 5) in the port for transmission to the network segment associated with the port. This transfer of data from the transmit buffer 318 to the MAC transceiver 308 is performed according to the requirements of the MAC transceiver 308. Accordingly, the MAC transceiver 308 continuously receives the data from the transmit buffer 318 according to the data communication rate of the port (e.g. 10 Mbps or 100 Mbps). In addition, the MAC transceiver 308 provides an appropriate inter-packet gap according to the IEEE 802.3 standard (e.g. a minimum of 0.96 $\mu$s for 100 Mbps ports). Once the entire packet is removed from the transmit buffer 318, the transmit FSM 314 returns to the idle state IDLE from the state S9.

If the data portion of the packet is longer than sixteen words, this indicates that one or more additional memory read operations are necessary to retrieve the entire packet from the packet buffers 206. Accordingly, the transmit FSM 314 moves from the state S5 to a state S6. In the state S6, the port again requests access to the bus 102 by raising the request REQ line 102F. The transmit FSM 314 remains in the state S6 until the port is notified by the bus control module 114, via the bus-grant-for-REQ command 04 H, that control of the bus 102 is granted to the port. Then, the transmit FSM 314 moves to a state S7.

In the state S7, the transmit FSM 314 determines the starting memory address in the packet buffers 206 from which to continue retrieving the packet. This address is determined by initially storing the starting address for the packet in one of the registers 304 (FIG. 5) and by incrementing this address for each memory read cycle performed. Also in the state S7, the port places a memory read command 01 H on the bus 102. The memory read command 01 H instructs the memory control module 118 (FIG. 3) to retrieve a number of words (one for each memory transfer cycle) of data from the packet buffers 206 (FIG. 3) starting at the address taken from the appropriate one of the registers 304 and also instructs the memory control module 114 to place this data on the bus 102. The number of words requested depends upon the amount of space available in the transmit buffer 318 once the transmit FSM 314 is in the state S7 and upon the length of the packet. For example, this number will generally vary depending upon how long the transmit FSM 314 waited to obtain access to the bus 102 in the state S6 and depending upon whether the port transmits at 100 Mbps or 10 Mbps.

Then, the transmit FSM 314 moves to a state S8. In the state S8, the memory transfer cycles requested in the state S7 are performed, one word received by the port each time the memory ready MEMRDY line 102E is pulsed. In the state S8, the transmit FSM 314 loads (pushes) the requested data into the transmit buffer 318 as it is received. Then, the bus 102 is released by issuing a bus-release command 01 H and the transmit FSM 314 moves to the state S9.

In the state S9, the contents of the transmit buffer 318 are removed (popped) and transferred to the MAC transceiver 308 in the port for transmission to the network segment associated with the port. This transfer is performed according to the requirements of the MAC transceiver 308. If the end of the packet is reached in the state S9, the transmit FSM 314 returns to the idle state IDLE from the state S9. Alternately, if a late collision occurs while the packet is being transmitted, the transmit FSM 314 returns to the idle state IDLE from the state S9. If additional memory read requests are required to complete transmission of the packet, the transmit FSM 314 returns to the state S6 prior to the transmit buffer 318 being emptied.

Note that after moving from the state S9 to the state S6, data continues to be popped from the transmit buffer 318 and transmitted over the network segment by the MAC transceiver 308. Therefore, the transmit FSM 314 preferably moves to the state S6 with sufficient packet data still in the transmit buffer 318 that the transmit FSM 314 has sufficient time to move through the states S6 and S7 and to begin pushing more packet data in the transmit buffer in the state S8. Thus, the transmit buffer 318 is preferably not emptied until the end of the packet is reached. If in the state S6, however, the port is not granted access to the bus 102 until after the transmit buffer 318 has been emptied by the MAC transceiver 308, this indicates an underflow condition. If an underflow condition occurs, the packet must be retransmitted by the port. Accordingly, in the event of an underflow condition, the port releases control of the bus 102 via the bus release command 01 H. Then, the transmit FSM 314 moves to the state S9. Because the transmit buffer 318 is empty, the transmit FSM 314 then immediately moves to the idle state IDLE from the state S9.

In the event that an underflow condition occurs in the state S6 or a collision occurs in the state S9, upon returning to the idle state IDLE from the state S9, the memory pointer for the packet is retained in the memory pointer buffer 306 so that the packet is retransmitted by the port. Otherwise, if the entire packet is successfully transmitted, upon returning to the idle state IDLE from the state S9, the memory pointer for the packet is removed from the memory pointer buffer 306 and discarded.

Alternately, assuming the transmit FSM 314 is in the idle state IDLE and a packet to be transmitted by the port is being received by another port (for cut-through), the transmit FSM 314 moves to a state S10 from the idle state IDLE. In the state S10, the port stores a number of memory transfer cycles that are to be performed for loading a first portion of the packet into the packet buffers 206. The number of transfer cycles to be performed is obtained when the memory write command 02 H is placed on the bus 102 by the port that is receiving the packet and is stored in an appropriate one of the registers 304 (FIG. 3).

Then, the transmit FSM 314 moves from the state S10 to a state S11. In the state S11, the port receives each word of the packet simultaneously with each memory transfer cycle (one memory transfer cycle each time the memory ready MEMRDY line 102E is pulsed) as the packet is being loaded into the packet buffers 206 and loads (pushes) the packet into the transmit buffer 318. After the indicated number of transfers are complete, the transmit FSM 314 moves to the state S12.

In the state S12, the packet is transferred from the transmit buffer 318 to the MAC transceiver 308 of the port at a rate determined by the requirements of the MAC transceiver 308. The MAC transceiver 308 transmits the packet over the associated network segment. If the end of the packet is reached such that the entire packet has been transmitted by the port, or if a collision occurs while the port is transmitting the packet, the transmit FSM 314 returns to the idle state IDLE from the state S12. If a collision occurs, the packet must be retransmitted by the port. Accordingly, in such case, a memory pointer for the packet is placed in the memory pointer buffer 306. Assuming one or more additional memory write operations are required to load the entire packet into the packet buffers 206, and no collision occurs in the state S12, the transmit FSM 314 returns to the state S10 from the state S12. Preferably, this occurs before the transmit buffer 318 is empty. In the state S10, when the next memory write operation is initiated for loading the packet into the packet buffers 306, the number of memory transfer cycles to be performed is stored in the appropriate one of the registers 304. As before, the transmit FSM 314 then moves to the state S11.

Note that after moving from the state S12 to the state S10, data continues to be popped from the transmit buffer 318 and transmitted over the network segment by the MAC transceiver 308. If in the state S10, however, the transmit buffer 318 empty, this indicates an underflow condition. If an underflow condition occurs, the transmit FSM 314 moves from the state Si0 to the state S12. Because the transmit buffer 318 is empty, the transmit FSM 314 immediately moves to the idle state IDLE from the state S12. In the event that an underflow condition is detected in the state S10, upon returning the idle state IDLE from the state S12, the memory pointer for the packet is placed in the memory pointer buffer 306 so that the packet is retransmitted by the port.

Note that for 100 Mbps ports (e.g. the ports 110–112 illustrated in FIG. 3), the IEEE 802.3 specification requires a minimum inter-packet gap of 0.96 $\mu$s. By observing the minimum inter-packet gap, each node on the affected network segment is able to identify the end of a packet and the beginning of a next packet. Therefore, when successive packets are transmitted by a port, they must be separated by at least 0.96 $\mu$s. A larger inter-packet gap is permissible, but is undesirable. A larger gap is especially undesirable when the affected network segment is congested. This is because the extra time between packets adds to delay in communicating the data contained in the packets and reduces the total amount of data that can be communicated over the affected network segment in a given time interval. Therefore, assuming multiple memory pointers are queued in the memory pointer buffer 306, when one of the 100 Mbps ports 110–112 completes transmission of a packet, the next packet should be readily available in the transmit buffer 306 of the port for transmission by the associated MAC transceiver 308.

In order to accomplish this, retrieval of the next packet can be initiated while the previous packet is still being transmitted. This solution has a drawback in that two sets of registers are required in the port to keep track of the starting position in the transmit buffer 318, the length, and the ending position in the transmit buffer 318 for each of the two packets. In addition, this solution requires that a determination be made when to initiate retrieval of the next packet prior to completing transmission of the prior packet. Thus, additional complexity would be required in each port for providing such registers and for making such a determination.

A preferred solution is for the prior packet to be completely transmitted and thereby removed from the transmit buffer 318 before the retrieval of the next packet is initiated. Because the bus clock preferably cycles at 40 Mhz, each bus clock cycle is approximately 0.025 $\mu$s. Therefore, the bus clock cycles 38.4 times during a 0.96 $\mu$s time interval (corresponding to the IEEE standard for inter-packet gap when transmitting at 100 Mbps). This means that the first portion of a next packet should be readily available in the transmit buffer 318 of a port within approximately thirty-eight bus clock cycles in order to maintain the inter-packet gap at 0.96 $\mu$s.

Note, however, that once the transmit FSM 314 obtains access to the bus 102, the transmit FSM 314 is configured to provide the first portion of a packet to the associated MAC transceiver 308 within approximately nineteen to twenty-two bus clock cycles. In particular, preferably only one bus clock cycle is required to issue the memory read command 01 H in the state S2 while preferably only one clock cycle is required in the states S3, S4 and S5 to read each of the eighteen words requested by the memory read command 01 H. Additional time (and, hence, additional bus clock cycles) may be required, however, if the memory control module 118 is unable to provide each word within one clock cycle each. Recall that the memory ready MEMRDY line 102E is pulsed for each memory transfer cycle, though the memory transfer cycles do not necessary coincide with the bus clock cycles. In addition, a minimum of one clock cycle is required for the bus control module 114 to grant the request for access to the bus 102 made in the state S1. If the bus 102 is congested, additional clock cycles will be required while waiting in the state SI for access to the bus. In most cases, however, once retrieval of a packet has been initiated (e.g. by the transmit FSM 314 moving from the idle state IDLE in FIG. 7 to the state S1), the transmit FSM 314 is configured to provide the first portion of a packet to the associated MAC transceiver 308 within thirty-eight bus clock cycles. Thus, the first portion of the packet will generally be available to the MAC transceiver 308 within 0.96 $\mu$s. If the first portion is provided in less time, as is expected to be the usual case, the MAC transceiver 308 waits any additional time required before transmitting the packet so that the total inter-packet gap is very nearly 0.96 $\mu$s.

This technique has an advantage of simplifying the configuration of the ports while minimizing the inter-packet gap. The configuration of the ports is simplified because only a single set of registers (included in the registers 304) is required for keeping track of each packet in the transmit buffer 318 for the port and no determination as to when to initiate retrieval of a next packet need be made prior to transmitting the end of a prior packet.

Figure 8:
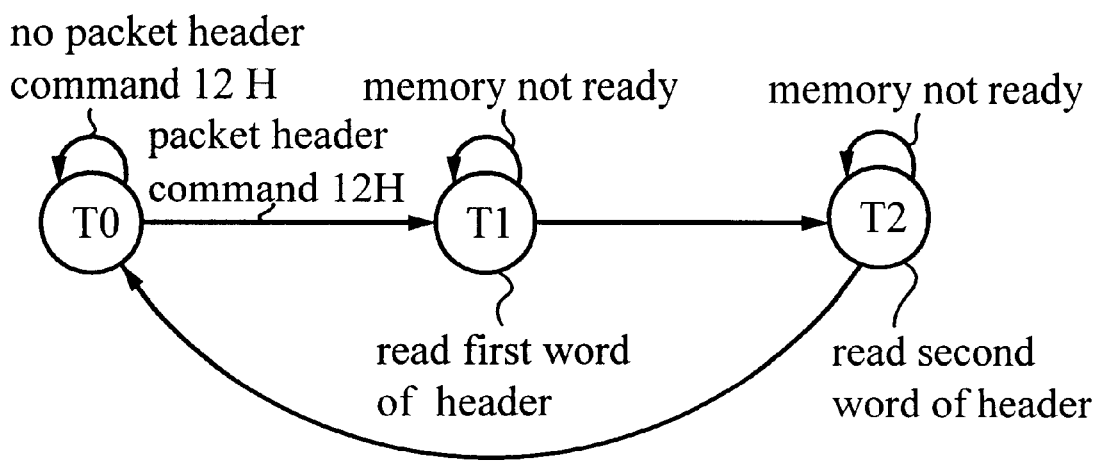
FIG. 8 illustrates a state diagram for a memory pointer FSM according to the present invention located in a port controller of each of the ports.

FIG. 8 illustrates a state diagram for the memory pointer finite state machine (memory pointer FSM) 303 (FIG. 5) located in the port controller 300 of each of the ports 104–112. In an idle state T0, the memory pointer FSM 303 monitors the bus 102 for packet headers being placed on the bus 102 by the other ports. Recall that a packet header is placed on the bus 102 during the packet header command 12 H for each packet after the packet is loaded into the packet buffers 206. A portion of the header includes the memory pointer (the starting address in the packet buffers 206 assigned to the packet and the identification number assigned to the packet).

Accordingly, when the memory pointer FSM 303 recognizes the packer header command 12 H it moves from the idle state T0 to a state T1. In the state T1, the memory pointer FSM 303 receives the first word of the header when it is available on the bus 102 and stores the first word in an appropriate one of the registers 304 (FIG. 5). Then, the memory pointer FSM 304 moves to a state T2. In the state T2, the memory pointer FSM 303 receives the second word of the header when it is available on the bus and stores it an appropriate one of the registers 304. Once the memory pointer FSM 303 has received both words of the header, it stores the memory pointer obtained from the header in its memory pointer buffer 306 (FIG. 5). Next, the memory pointer FSM 303 returns the idle state T0 where it awaits a next packet header command 12 H to appear on the bus 102.

Figure 9:
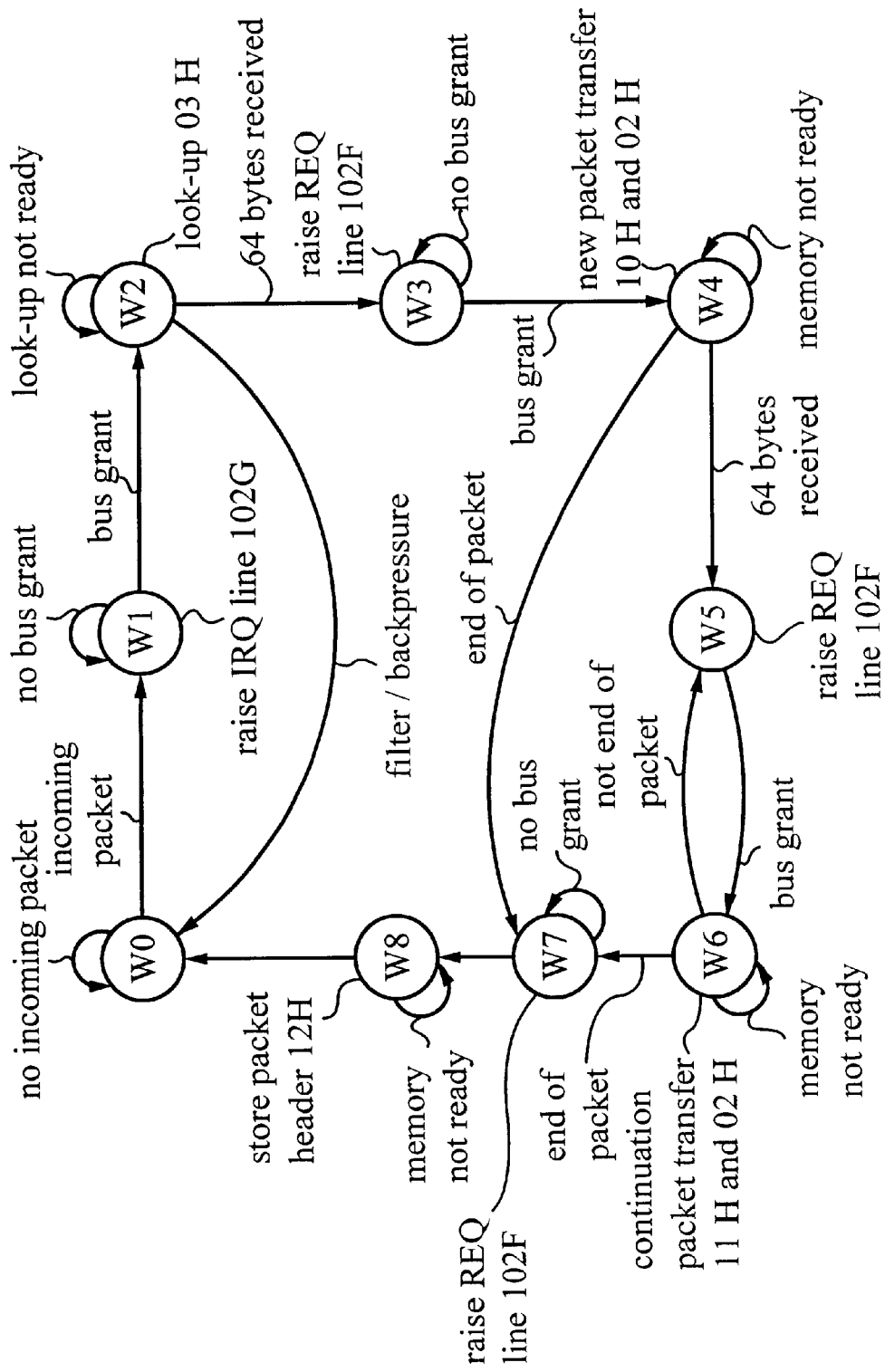
FIG. 9 illustrates a state diagram for a receive FSM according to the present invention located in each of the ports.

FIG. 9 illustrates a state diagram for the receive finite state machine (FSM) 312 (FIG. 5) located in each of the ports 104–112. As mentioned, packets communicated over the network segment associated with a port are received by the MAC transceiver 308 (FIG. 5) of the port. Each packet is loaded into the receive buffer 316 (FIG. 5) as the packet is being received by the MAC transceiver 308. Referring to FIG. 9, in an idle state W0, the receive FSM 312 monitors the receive buffer 316 for incoming packets. So long as there is no incoming packet, the receive FSM 312 remains in the idle state W0. Assuming there is an incoming packet, after the first twelve bytes, corresponding to the source address and the destination address for the packet, are loaded into the receive buffer 316, the receive FSM 312 moves to a state W1. In the state W1, the receive FSM 312 requests access to the bus 102 by raising the interrupt IRQ line 102G.

The receive FSM 312 remains in the state W1 until the port is granted access to the bus 102 via the bus-grant-for-IRQ command 14 H. Then, the receive FSM 312 moves to a state W2 where the port requests a look-up cycle for the packet by issuing a look-up command 03 H. The receive FSM 312 remains in the state W2 until the look-up ready command 03 H appears on the bus 102. If the look-up ready command 03 H indicates that the packet is to be filtered, the receive FSM 312 returns to the state W0, thus, taking no further action relative the incoming packet. Alternately, if another port raises the jam request JAM REQ line 102D to initiate backpressure, the port receiving the packet sends a jam signal over its associated network segment and the receive FSM 312 then returns to the state W0.

Assuming the packet is not filtered and no jam request is made, the receive FSM 312 waits until 64 bytes of the packet, or the end of the packet, has been received into the receive buffer 316. Once 64 bytes of the packet have been received, the receive FSM 312 moves to a state W3 where the port requests access to the bus 102 again, this time by raising the REQ line 102F. The receive FSM 312 remains in the state W3 until granted access to the bus 102 via the bus-grant-for-REQ command 04 H.

Once access to the bus 102 is obtained, the receive FSM 312 moves to a state W4 where the receive FSM 312 initiates a memory write operation for loading a first portion of the packet into the packet buffers 206 (FIG. 3). The starting address for the packet is calculated by the port and stored in an appropriate one of the registers 304 (FIG. 5). The memory write operation is initiated by the port issuing a new packet transfer command 10 H and, then, a memory write command 02 H. Once the memory write operation is complete, the receive FSM 312 releases the bus 102. If the end of the packet was received in the state W3, the receive FSM 312 moves from the state W4 to a state W7 (described herein). Otherwise, the receive FSM 312 waits in the state W4 until the next 64 bytes of the incoming packet, or the end of the incoming packet, is received.

Once the next 64 bytes of the packet are received, the receive FSM 312 moves to a state W5. In the state W5 the receive FSM 312 again requests access to the bus 102 by raising the request REQ line 102F. Once access to the bus is granted, the receive FSM 312 moves to a state W6 where the port initiates another memory write operation for loading the packet into the packet buffers 206. The address for this memory write operation is calculated based upon the starting address assigned to the packet and the number of transfer cycles already completed. This data is stored in an appropriate one of the registers 304. To initiate the memory write operation, the port issues a continuation packet transfer command 11 H and, then, a memory write command 02 H.

Once the memory write operation initiated in the state W6 is complete, the receive FSM 312 releases the bus 102. If the end of the packet was not received in the state W5, the receive FSM 312 waits until the next 64 bytes, or the end of the packet, has been received and returns to the state W5. The receive FSM 312 transitions back and forth between the states W5 and W6 in this manner until the end of the packet is received.

Once the end of the packet is received in the state W5 and loaded into the packet buffers in the state W6, the receive FSM 312 then moves to the state W7. In the state W7, the receive FSM 312 forms the two-word header for the packet and places the header in the registers 304. Then, the port requests access to the bus by raising the REQ line 102F. The receive FSM 312 remains in the state W7 until access to the bus is granted via the bus-grant-for-REQ command 04 H. Once access to the bus 102 is granted, the receive FSM 312 then moves to a state W8.

In the state W8, the receive FSM 312 loads the header for the packet into the packet buffers 206 at the starting address assigned to the packet. This is accomplished by the port issuing a packet header command 12 H. Once the header is stored, the receive FSM 312 returns to the idle state W0 to await a next incoming packet.

According to the operation of each port, at any time, one, two or all three of the FSMs 314, 303 and 312 in the port can be active. In the preferred embodiment, however, a single set of registers (included in the registers 304) is provided in each port for keeping track of operational parameters for all of the FSMs 314, 303 and 312. This single set of registers includes at least one register that is shared by at least two of the FSMs 314, 303 and 312 which use the register at different times. Thus, registers included in the registers 304 that are used only for certain states in each of the FSMs 314, 303 and 312, are shared assuming these states do not simultaneously require the same register.

This technique of sharing the same registers among the different FSMs 314, 303 and 312 has an advantage of further simplifying the configuration of the ports because only a single set of registers (included in the registers 304) is required for keeping track of the current state and operational parameters for all of the FSMs 314, 303 and 312. Thus, the total number of registers 304 required is reduced in comparison to providing dedicated registers to each FSM.

Figure 10:
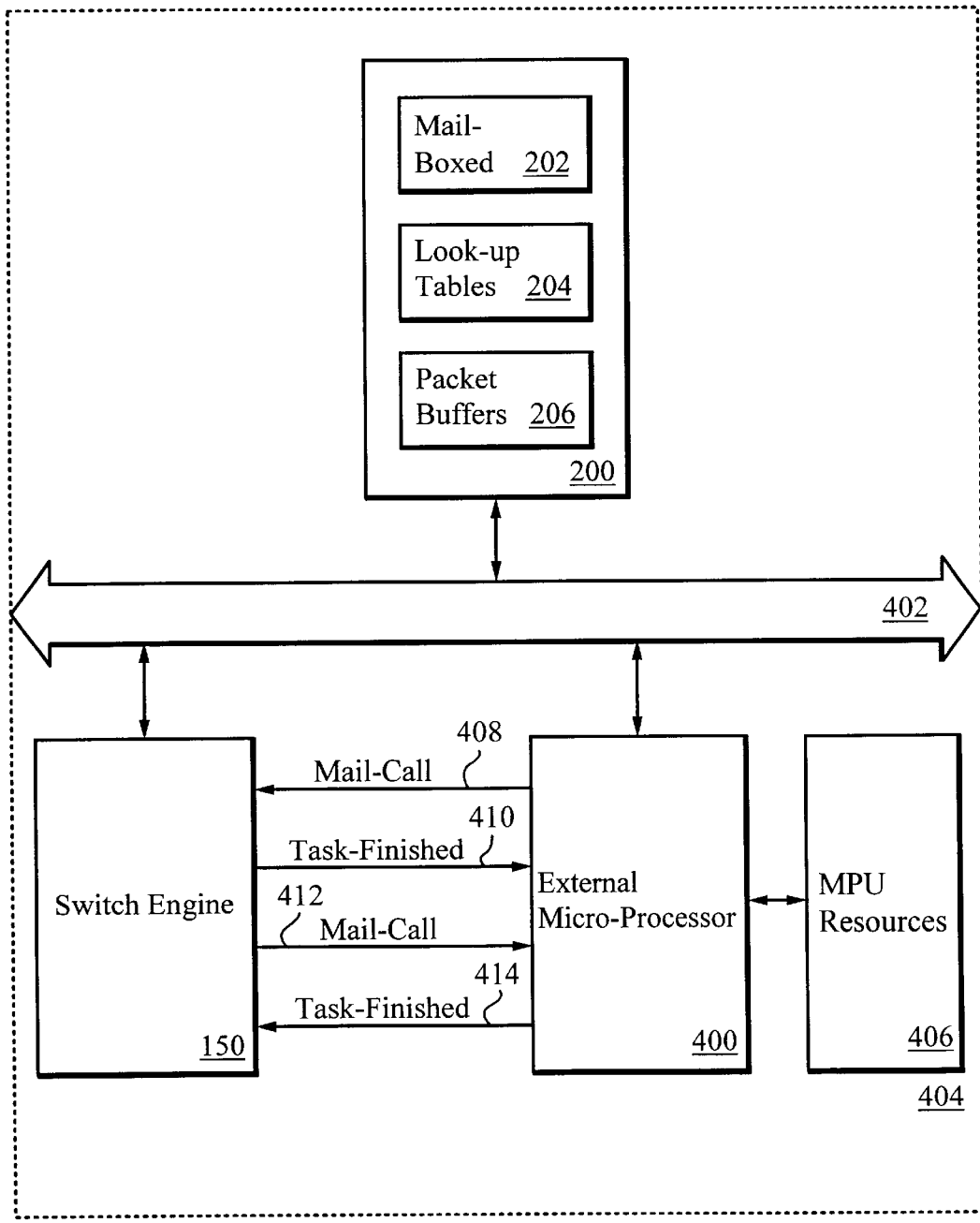
FIG. 10 illustrates a block schematic diagram of the switch engine, a memory device and an external processor according to the present invention.

FIG. 10 illustrates a block schematic diagram of the switch engine 150, the memory device 200 and an external processor 400 according to the present invention. The switch engine 150 includes the bus control block 114, the MPU port and mailbox 116, the memory control block 118 and the look-up control block 120 illustrated in FIG. 3. A memory bus 402 interconnects the switch engine 150 and the external processor 400 to the memory device 200. Preferably, access to the memory device 200 by the switch engine 150 and the external processor 400 is implemented by a multiplexor included as part of the memory bus 402 and which multiplexor is controlled by the switch engine 150. The switch engine 150, including the communication bus 102 (FIG. 3), is preferably implemented as an integrated circuit mounted to a printed circuit board 404. The memory device 200 and the external processor 400 are also mounted to the printed circuit board 404.

As described above in reference to FIGS. 3–9, the bridging and filtering functions of the multi-port bridge are performed primarily by the multi-port bridge 100 and the buffer memory 200. Because the multi-port bridge 100 is preferably implemented as a number of finite state machines interconnected via the communication bus 102, the multi-port bridge 100 provides a high bandwidth capacity for directing data packets through the multi-port bridge. Thus, according to the present invention, the external processor 400 is provided to perform tasks in support of the functioning of the multi-port bridge 100. These functions include: providing a communication port for enabling the nodes of the LAN to communicate with nodes of a dissimilar LAN or a WAN and for enabling the nodes of the LAN to communicate with a file server for the LAN; providing parameters for initializing registers of the switch engine via a register load command 0C (Table 1); collecting data from the LAN for performing network management functions via a register read command 0D (Table 1); and providing services to the multi-port bridge 100. The mailbox interface according to the present invention allows the external processor 400 to provide these functions without the need to dedicate a large number of pins of the integrated circuit package to such an interface.

Preferably, the external processor 400 is implemented as a reduced instruction set computer (RISC) to improve speed performance. The external processor 400 can have its own dedicated resources 406, such as memory for storing operating software for the external processor 400 and for use by the external processor 400 as a scratch pad. In addition, when the external processor 400 performs the functions of a file server for the LAN, the resources 406 can include a mass storage device for storing application programs and data files which is accessible by the external processor 400. Also, when the external processor 400 performs the function of providing an interconnection of the LAN to a dissimilar LAN or to a WAN, the resources 406 can include a communication device, such as a telephone modem, an integrated services digital network (ISDN) interface, a T1 media interface or a T3 media interface which is accessible by the external processor 400. In addition, multiple external processors 400 can be coupled to the memory bus 402. In such case, additional resources can be provided for such multiple external processors, such as one or more mass storage devices and/or one or more communication devices.

When a packet is originated by the external processor 400, the destination address and source address for the packet are placed in the memory 200 by the external processor 400. Thus, rather than obtaining the destination and source addresses from the source port, the destination and source addresses are obtained from the memory 200. The memory control module 118 places a look-up gated with MEMRDY command 09 on the control lines 102B of the bus 102, retrieves the destination address and source address from the memory 200, and places them on the data lines 102A. As with the look-up command 03 H, transfer of the destination and source addresses is performed over several bus clock cycles. The look-up control module 120 responds to the look-up gated with MEMRDY command 09 by waiting until the MEMRDY line 102E is raised to a logic high voltage level before beginning to receive the destination and source addresses for performing a look-up cycle. This ensures that the destination and source addresses appearing on the data lines 102A are valid before the look-up control module 120 receives them.

Figure 11:
FIG. 11 illustrates a "triplet" according to the present invention, including a first field containing an identification of a source port, a second field containing an identification of a destination port, and a third field containing a memory address.

In an alternate embodiment, the memory pointer buffer 306 of each port stores memory pointers, referred to as "triplets" for data packets being queued in the packet buffers 206 of the DRAM memory 200, rather than the memory pointers described above (having a packet identification number and memory starting address). FIG. 11 illustrates a "triplet" according to the present invention. Each triplet includes three fields: a first field 500 containing the identification of the source port, a second field 502 containing the identification of the destination port, and a third field 504 containing a starting address assigned to the incoming packet in the packet buffers 206.

As before, while a packet is being received by the source port, a look-up cycle is initiated by the source port to identify the appropriate destination port for the packet based upon the destination address. A result of performing the look-up for each packet, however, is a triplet. The starting address contained in the triplet is assigned by the memory control module 118. While the packet is being received by the source port, the memory control module 118 places an "initial" triplet on the data lines 102A of the communication bus 102 and places a corresponding initial triplet command on the control lines 102B. This is in contrast to placing the bit-map of the destination ports on the data lines 102A and placing the associated the look-up ready command 08 H on the control lines 102B, as described above. The initial triplet is received by each port. If the source port and the destination port are the same, this indicates that the source and destination nodes are on the same segment of the LAN (intra-segment communication). The source port recognizes this condition and, in response, filters the packet.

If the port identified as the destination port in the triplet is not currently busy transmitting or receiving another packet, the destination port configures itself to receive the packet directly from the source port (cut-through). However, if the memory pointer buffer 306 in the port identified as the destination port in the triplet is nearly full, the bus controller 300 of the destination port raises the JAM REQ line 102D. The source port receives the jam request and, in response, discards the incoming packet and also sends a jam signal over its associated segment. The jam signal causes the node (source node) which is the source of the packet to discontinue sending the packet and attempt to resend the packet after a waiting period.

The packet is loaded from the receive buffer of the source port into the packet buffers 206 starting at the memory address identified by the third field of the triplet. As before, a predetermined offset provides a space for storing header information for the packet. Writing of the packet into the packet buffers 206 preferably occurs as the remainder of the packet is still being received into the receive buffer of the source port. For this reason, the receive buffer 316 for each port need not be capable of storing the entire data packet. In addition, if the destination port is configured for cut-through, the destination port will receive the packet into its transmit buffer 318 directly from the communication bus 102 simultaneously with the write cycles for loading of the packet into the packet buffers 206. During such a cut-through operation, the packet is received into the transmit buffer 318 of the destination port and immediately transmitted to the LAN segment associated with the destination port.

Once the entire packet has been loaded into the packet buffers, the memory control module 118 places a "final" triplet on the data lines 102A of the communication bus 102 and places a corresponding final triplet command on the control lines 102B. It should be noted that the bit patterns for the initial triplet and for the final triplet are preferably identical, while the bit patterns placed on the command lines of the communication bus 102 for identifying each of the initial and final triplets are distinct. The destination port receives the final triplet and stores it in its memory pointer buffer 306. This is in contrast to placing the packet identification and assigned starting address in the memory pointer buffer, as described above. Thus, the packet is queued for transmission by the destination port.

Then, when the destination port is no longer busy, the destination port retrieves the packet from the packet buffers 206 by gaining access to the communication bus 102 and initiates a series of read operations over the communication bus 102 beginning at the starting address in the packet buffers 206 of the packet (from the third field of the triplet for the packet).

In both embodiments, the memory pointers stored in the memory pointer buffer 306 of each port are preferably of a uniform size. Therefore, the exact number of memory pointers that can be accommodated by a memory pointer buffer 306 of a port can be determined from the amount of space available in the memory pointer buffer 306 of the port. Accordingly, unlike prior arrangements, extra space does need to be provided in the port to accommodate a data packet having an unknown length. According to the present invention, however, the jam request (raising the JAM REQ line) is preferably generated by a destination port for a packet when the memory pointer buffer 306 in the port is nearly full, but has space available to store several memory pointers (e.g. ten). This provides the destination port an ability to store memory pointers for packets which are in the process of being loaded into the packet buffers 206. The memory pointer buffer 306 in each port is preferably sized relative to the associated packet buffers 206 in the memory device 200 such that there is only a small possibility that the packet buffers 206 will become full before any memory pointer buffer 306 becomes full. For example, because each port can hold up to 128 memory pointers, the packet buffers 206 can preferably accommodate 128 data packets of the maximum size for each port. In practice, the packet buffers 206 can be somewhat smaller because not every packet is expected to have the maximum size.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. A multi-port bridge for interconnecting a plurality of segments of a local area network, the multi-port bridge having a plurality of ports, at least one of the ports comprising:
   a. means for controlling transmittal of packets from the port to an associated network segment;
   b. means for controlling receiving packets into the port from the associated network segment; and
   c. a first shared register wherein, at different times, the means for controlling transmittal of packets utilizes the first shared register for storing a first operational parameter and the means for controlling receiving packets utilizes the first shared register for storing a second operational parameter.

2. The multi-port bridge according to claim 1 further comprising a second shared register wherein, at different times, the means for controlling transmittal of packets utilizes the second shared register for storing a third operational parameter and the means for controlling receiving packets utilizes the second shared register for storing a fourth operational parameter.

3. The multi-port bridge according to claim 1 further comprising:
   a. a means for controlling storage of memory pointers indicative of an assigned location in a memory device for each packet; and
   b. a second shared register wherein, at different times, the means for controlling transmittal of packets utilizes the second shared register for storing a third operational parameter and the means for controlling storage of memory pointers utilizes the second shared register for storing a fourth operational parameter.

4. The multi-port bridge according to claim 1 further comprising:
   a. a means for controlling storage of memory pointers indicative of an assigned location in a memory device for each packet; and
   b. a second shared register wherein, at different times, the means for controlling receiving packets utilizes the second shared register for storing a third operational parameter and the means for controlling storage of memory pointers utilizes the second shared register for storing a fourth operational parameter.

5. A multi-port bridge for interconnecting a plurality of segments of a local area network, the multi-port bridge having a plurality of ports, at least one of the ports comprising:
   a. a register;
   b. a transmit finite state machine to control retrieval of packets from an assigned location for each packet in a memory device wherein the transmit finite state machine utilizes the register for storing an operational parameter of the transmit finite machine; and
   c. a receive finite state machine to control storage of packets in the memory device at the assigned location for each packet wherein the receive finite state machine utilizes the register for storing an operational parameter of the receive finite state machine.

6. The multi-port bridge according to claim 5 wherein at all points in time during operation of the multi-port bridge, not more than one of the transmit finite state machine and the receive finite state machine stores an operational parameter in the register.

7. The multi-port bridge according to claim 5 further comprising a memory pointer finite state machine to control storage of memory pointers indicative of the assigned location in the memory device for each packet wherein the memory pointer finite state machine utilizes the register for storing an operational parameter of the memory pointer finite state machine.

8. The multi-port bridge according to claim 7 wherein at all points in time during operation of the multi-port bridge, not more than one of the transmit finite state machine, the receive finite state machine and the memory pointer finite state machine stores an operational parameter in the register.

9. The multi-port bridge according to claim 7 wherein each memory pointer includes an identification number and an address indicative of the assigned location in the memory device.

10. A multi-port bridge for interconnecting a plurality of segments of a local area network, the multi-port bridge having a plurality of ports, at least one of the ports comprising:
   a. a register;
   b. a receive finite state machine to control storage of packets in the memory device at an assigned location for each packet wherein the receive finite state machine utilizes the register for storing an operational parameter of the receive finite state machine; and
   c. a memory pointer finite state machine to control storage of memory pointers indicative of the assigned location in the memory device for each packet wherein the memory pointer finite state machine utilizes the register for keeping track of an operational parameter of the memory pointer finite state machine.

11. The multi-port bridge according to claim 10 wherein at all points in time during operation of the multi-port bridge, not more than one of the receive finite state machine and the memory pointer finite state machine stores an operational parameter in the register.

12. The multi-port bridge according to claim 10 wherein each memory pointer includes an identification number and an address indicative of the assigned location in the memory device.

13. A multi-port bridge for interconnecting a plurality of segments of a local area network, the multi-port bridge having a plurality of ports, at least one of the ports comprising:
  a. a register;
  b. a transmit finite state machine to control retrieval of packets from an assigned location for each packet in a memory device wherein the transmit finite state machine utilizes the register for storing an operational parameter of the transmit finite machine; and
  c. a memory pointer finite state machine to control storage of memory pointers indicative of the assigned location in the memory device for each packet wherein the memory pointer finite state machine utilizes the register for keeping track of an operational parameter of the memory pointer finite state machine.

14. The multi-port bridge according to claim 13 wherein at all points in time during operation of the multi-port bridge, not more than one of the transmit finite state machine and the memory pointer finite state machine stores an operational parameter in the register.

15. The multi-port bridge according to claim 13 wherein each memory pointer includes an identification number and an address indicative of the assigned location in the memory device.

16. A multi-port bridge for interconnecting a plurality of segments of a local area network, the multi-port bridge having a plurality of ports, at least one of the ports comprising:
  a. a register;
  b. a transmit finite state machine to control transmission of packets to a segment of the local area network associated with the port wherein the transmit finite state machine utilizes the register for storing an operational parameter of the transmit finite machine; and
  c. a receive finite state machine to control reception of packets from the segment of the local area network associated with the port wherein the receive finite state machine utilizes the register for storing an operational parameter of the receive finite state machine.

17. The multi-port bridge according to claim 16 wherein at all points in time during operation of the multi-port bridge, not more than one of the transmit finite state machine and the receive finite state machine stores an operational parameter in the register.

18. A method of controlling a port in a multi-port bridge wherein the multi-port bridge interconnects a plurality of segments of a local area network via a plurality of ports, the method comprising steps of:
  a. providing a register in the port;
  b. storing an operational parameter for a transmit finite machine in the register wherein the transmit finite state machine controls transmittal of packets from the port to an associated network segment; and
  c. storing an operational parameter for a receive finite machine in the register wherein the receive finite state machine controls receiving packets into the port from the associated network segment.

19. The method according to claim 18 wherein at all points in time during operation of the multi-port bridge, not more than one of the transmit finite state machine and the receive finite state machine stores an operational parameter in the register.

20. The method according to claim 18 further comprising a step of storing an operational parameter for a memory pointer finite state machine in the register wherein the memory pointer finite state machine controls storage of memory pointers indicative of an assigned location in a memory device.

21. The method according to claim 20 wherein at all points in time during operation of the multi-port bridge, not more than one of the transmit finite state machine, the receive finite state machine and the memory pointer finite state machine stores an operational parameter in the register.

22. The method according to claim 20 wherein each memory pointer includes an identification number and an address indicative of the assigned location in the memory device.

23. A multi-port bridge for interconnecting a plurality of segments of a local area network, the multi-port bridge having a plurality of ports, at least one of the ports comprising:
  a. a register;
  b. a transmit finite state machine to control transmittal of packets from the port to an associated network segment wherein the transmit finite state machine utilizes the register for storing an operational parameter of the transmit finite machine; and
  c. a receive finite state machine to control receiving packets into the port from the associated network segment wherein the receive finite state machine utilizes the register for storing an operational parameter of the receive finite state machine.

24. The multi-port bridge according to claim 23 wherein at all points in time during operation of the multi-port bridge, not more than one of the transmit finite state machine and the receive finite state machine stores an operational parameter in the register.

25. The multi-port bridge according to claim 23 further comprising a memory pointer finite state machine to control storage of memory pointers indicative of an assigned location in a memory device for each packet wherein the memory pointer finite state machine utilizes the register for storing an operational parameter of the memory pointer finite state machine.

26. The multi-port bridge according to claim 25 wherein at all points in time during operation of the multi-port bridge, not more than one of the transmit finite state machine, the receive finite state machine and the memory pointer finite state machine stores an operational parameter in the register.

27. The multi-port bridge according to claim 25 wherein each memory pointer includes an identification number and an address indicative of the assigned location in the memory device.

* * * * *

UNITED STATES PATENT AND TRADEMARK OFFICE
CERTIFICATE OF CORRECTION

| | | |
|---|---|---|
| PATENT NO. | : 6,252,879 B1 | |
| APPLICATION NO. | : 09/078412 | |
| DATED | : June 26, 2001 | |
| INVENTOR(S) | : Zhang | |

It is certified that error appears in the above-identified patent and that said Letters Patent is hereby corrected as shown below:

On the Title Page
[ITEM 56]

Please add

| | | | |
|---|---|---|---|
| --U.S. Patent No. 6,137,797 | 10/24/2000 | Bass et al. | 370/392; |
| U.S. Patent No. 6,091,725 | 07/18/2000 | Cheriton et al. | 370/392; |
| U.S. Patent No. 6,075,773 | 06/13/2000 | Clark et al. | 370/241; |
| U.S. Patent No. 6,018,526 | 01/25/2000 | Liu et al. | 370/401; |
| U.S. Patent No. 5,978,378 | 11/02/1999 | Van Seters et al. | 370/401; |
| U.S. Patent No. 5,951,651 | 09/14/1999 | Lakshman et al. | 709/239; |
| U.S. Patent No. 5,949,788 | 09/07/1999 | Friedman et al. | 370/431; |
| U.S. Patent No. 5,940,597 | 08/17/1999 | Chung | 395/200.72; |
| U.S. Patent No. 5,926,473 | 07/20/1999 | Gridley | 370/389; |
| U.S. Patent No. 5,923,654 | 07/13/1999 | Schnell | 370/390; |
| U.S. Patent No. 5,917,821 | 06/29/1999 | Gobuyan et al. | 370/392; |
| U.S. Patent No. 5,857,075 | 01/05/1999 | Chung | 395/200.53; |
| U.S. Patent No. 5,844,903 | 12/01/1998 | Terashita et al. | 370/403; |
| U.S. Patent No. 5,802,047 | 09/01/1998 | Kinoshita | 370/359; |
| U.S. Patent No. 5,764,895 | 06/09/1998 | Chung | 395/700.8; |
| U.S. Patent No. 5,761,435 | 06/02/1998 | Fukuda et al. | 395/200.68; |
| U.S. Patent No. 5,721,927 | 02/24/1998 | Baraz et al. | 395/705; |
| U.S. Patent No. 5,640,399 | 06/17/1997 | Rostoker et al. | 370/392; |
| U.S. Patent No. 5,621,725 | 04/15/1997 | Kawamura et al. | 370/43; |
| U.S. Patent No. 5,617,421 | 04/01/1997 | Chin et al. | 370/402; |
| U.S. Patent No. 5,608,879 | 03/04/1997 | Cooke | 395/290; |
| U.S. Patent No. 5,608,730 | 03/04/1997 | Osakabe et al. | 370/471; |
| U.S. Patent No. 5,602,851 | 02/11/1997 | Terashita et al. | 370/403; |
| U.S. Patent No. 5,600,664 | 02/04/1997 | Hayashi | 371/43; |
| U.S. Patent No. 5,598,581 | 01/28/1997 | Daines et al. | 395/872 |
| U.S. Patent No. 5,598,391 | 01/28/1997 | Mukawa | 369/54; |
| U.S. Patent No. 5,598,278 | 01/28/1997 | Tanaka et al. | 386/96; |
| U.S. Patent No. 5,598,161 | 01/28/1997 | Yamada | 341/159; |
| U.S. Patent No. 5,570,466 | 10/29/1996 | Oechsle | 395/200.15; |
| U.S. Patent No. 5,570,330 | 10/29/1996 | Okawa | 369/44.32; |
| U.S. Patent No. 5,568,643 | 10/22/1996 | Tanaka | 395/739; |
| U.S. Patent No. 5,568,476 | 10/22/1996 | Sherer et al. | 370/60; |
| U.S. Patent No. 5,565,929 | 10/15/1996 | Tanaka | 348/565; |
| U.S. Patent No. 5,560,038 | 09/24/1996 | Haddock | 395/800; |
| U.S. Patent No. 5,559,796 | 09/24/1996 | Edem et al. | 370/60; |

UNITED STATES PATENT AND TRADEMARK OFFICE
CERTIFICATE OF CORRECTION

PATENT NO. : 6,252,879 B1
APPLICATION NO. : 09/078412
DATED : June 26, 2001
INVENTOR(S) : Zhang It is certified that error appears in the above-identified patent and that said Letters Patent is hereby corrected as shown below:

On Title Page
[ITEM 56]

Please add (cont'd)

| | | | |
|---|---|---|---|
| U.S. Patent No. 5,550,826 | 08/27/1996 | Tanaka et al. | 370/85.8; |
| U.S. Patent No. 5,541,923 | 07/30/1996 | Kato | 370/85.1; |
| U.S. Patent No. 5,530,434 | 06/25/1996 | Kanda | 340/825.04; |
| U.S. Patent No. 5,522,059 | 05/28/1996 | Marushima et al. | 395/476; |
| U.S. Patent No. 5,521,913 | 05/28/1996 | Gridley | 370/58.2; |
| U.S. Patent No. 5,515,513 | 05/07/1996 | Metzger et al. | 395/200.15; |
| U.S. Patent No. 5,515,376 | 05/07/1996 | Murthy et al. | 370/85.13; |
| U.S. Patent No. 5,506,902 | 04/09/1996 | Kubota | 380/9; |
| U.S. Patent No. 5,502,748 | 03/26/1996 | Wilkinson | 375/354; |
| U.S. Patent No. 5,487,067 | 01/23/1996 | Matsushige | 370/85.7; |
| U.S. Patent No. 5,481,540 | 01/02/1996 | Huang | 370/85.13; |
| U.S. Patent No. 5,457,679 | 10/10/1995 | Eng et al. | 370/16; |
| U.S. Patent No. 5,457,446 | 10/10/1995 | Yamamoto | 340/825.24; |
| U.S. Patent No. 5,448,565 | 09/05/1995 | Chang et al. | 370/85.13; |
| U.S. Patent No. 5,446,726 | 08/29/1995 | Rostoker et al. | 370/17; |
| U.S. Patent No. 5,442,578 | 08/15/1995 | Hattori | 364/746.1; |
| U.S. Patent No. 5,434,861 | 07/18/1995 | Pritty et al. | 370/85.8 |
| U.S. Patent No. 5,432,511 | 07/11/1995 | Sadjadian et al. | 341/61; |
| U.S. Patent No. 5,430,762 | 07/04/1995 | Vijeh et al. | 375/211; |
| U.S. Patent No. 5,410,754 | 04/25/1995 | Klotzbach et al. | 370/85.13; |
| U.S. Patent No. 5,404,459 | 04/04/95 | Gulick et al. | 395/275; |
| U.S. Patent No. 5,386,413 | 01/31/1995 | McAuley et al. | 370/54; |
| U.S. Patent No. 5,379,296 | 01/03/1995 | Johnson et al. | 370/60; |
| U.S. Patent No. 5,379,289 | 01/03/1995 | DeSouza et al. | 370/85.13; |
| U.S. Patent No. 5,353,353 | 10/04/1994 | Vijeh et al. | 380/29; |
| U.S. Patent No. 5,339,316 | 08/16/1994 | Diepstraten | 370/85.13; |
| U.S. Patent No. 5,307,345 | 04/26/1994 | Lozowick et al. | 370/61; |
| U.S. Patent No. 5,274,631 | 12/28/1993 | Bhardwaj | 370/60; |
| U.S. Patent No. 5,243,699 | 09/07/1993 | Nickolls et al. | 395/275; |
| U.S. Patent No. 5,241,550 | 08/31/1993 | Kusano | 371/71; |
| U.S. Patent No. 5,229,993 | 07/20/1993 | Foudriat et al. | 370/853; |
| U.S. Patent No. 5,184,346 | 02/02/1993 | Kozaki et al. | 370/60; |
| U.S. Patent No. 5,166,926 | 11/24/1992 | Cisneros et al. | 370/60; |
| U.S. Patent No. 5,151,994 | 09/29/1992 | Wille et al. | 395/800; |
| U.S. Patent No. 5,151,897 | 09/29/1992 | Suzuki | 370/85.13; |

UNITED STATES PATENT AND TRADEMARK OFFICE
CERTIFICATE OF CORRECTION

PATENT NO.       : 6,252,879 B1
APPLICATION NO.  : 09/078412
DATED            : June 26, 2001
INVENTOR(S)      : Zhang It is certified that error appears in the above-identified patent and that said Letters Patent is hereby corrected as shown below:

On Title Page
[ITEM 56]

Please add (cont'd)

| | | | |
|---|---|---|---|
| U.S. Patent No. 5,140,585 | 08/18/1992 | Tomikawa | 370/60.1; |
| U.S. Patent No. 5,119,367 | 06/02/1992 | Kawakatsu et al. | 370/54; |
| U.S. Patent No. 5,107,489 | 04/21/1992 | Brown et al. | 370/58.2; |
| U.S. Patent No. 5,048,014 | 09/10/1991 | Fischer | 370/85.5; |
| U.S. Patent No. 5,027,350 | 06/25/1991 | Marshall | 370/85.13; |
| U.S. Patent No. 5,020,052 | 05/28/1991 | DePrycker et al. | 370/60; |
| U.S. Patent No. 5,016,159 | 05/14/1991 | Maruyama | 364/200; |
| U.S. Patent No. 4,935,922 | 06/19/1990 | Wicklund et al. | 370/60; |
| U.S. Patent No. 4,933,937 | 06/12/1990 | Konishi | 370/85.13; |
| U.S. Patent No. 4,905,219 | 02/27/1990 | Barr et al. | 370/4; |
| U.S. Patent No. 4,901,308 | 02/13/1990 | Deschainc | 370/58.1; |
| U.S. Patent No. 4,878,216 | 10/31/1989 | Yunoki | 370/60 |
| U.S. Patent No. 4,849,962 | 07/18/1989 | Morimoto et al. | 370/29; |
| U.S. Patent No. 4,823,338 | 04/18/1989 | Chan et al. | 370/85; |
| U.S. Patent No. 4,797,879 | 01/10/1989 | Habbab et al. | 370/3; |
| U.S. Patent No. 4,744,078 | 05/10/1988 | Kowalczyk | 370/85; |
| U.S. Patent No. 4,737,953 | 04/12/1998 | Koch et al. | 370/94; |
| U.S. Patent No. 4,727,538 | 02/23/1988 | Furchtgott et al. | 370/85; |
| U.S. Patent No. 4,727,537 | 02/23/1988 | Nichols | 370/85; |
| U.S. Patent No. 4,723,311 | 02/02/1988 | Moustakas et al. | 455/612; |
| U.S. Patent No. 4,718,060 | 01/05/1988 | Oguchi et al. | 370/85; |
| U.S. Patent No. 4,715,030 | 12/22/1987 | Koch et al. | 370/85; |
| U.S. Patent No. 4,710,769 | 12/01/1987 | Friedman et al. | 340/825.030; |
| U.S. Patent No. 4,707,827 | 11/17/1987 | Bione et al. | 370/85; |
| U.S. Patent No. 4,706,081 | 11/10/1987 | Hart et al. | 340/825.03; |
| U.S. Patent No. 4,627,052 | 12/02/1986 | Hoare et al. | 370/88; |
| U.S. Patent No. 4,597,078 | 06/24/1986 | Kempf | 370/94; |
| U.S. Patent No. 4,589,120 | 05/13/1986 | Mendala | 375/117; |
| U.S. Patent No. 4,213,201 | 07/15/1980 | Gagnier et al. | 370/62; |
| U.S. Patent No. 3,735,357 | 05/22/1973 | Maholick et al. | 340/172.5; |
| Re 33,426 | 01/06/1990 | Sugimoto et al. | 370/85.14; |
| H586 pub. | 02/07/1989 | Kun | 370/94; |

UNITED STATES PATENT AND TRADEMARK OFFICE
CERTIFICATE OF CORRECTION

| | | |
|---|---|---|
| PATENT NO. | : 6,252,879 B1 | |
| APPLICATION NO. | : 09/078412 | |
| DATED | : June 26, 2001 | |
| INVENTOR(S) | : Zhang | |

It is certified that error appears in the above-identified patent and that said Letters Patent is hereby corrected as shown below:

On Title Page
[ITEM 56]

Please add (cont'd)

| | | |
|---|---|---|
| European Patent Document No. 0 397 188 A2 | 11/14/1990 | H04L/12/46; |
| European Patent Document No. 0 609 626 A2 | 08/10/1994 | H04L/12/50; |
| European Patent Publication No. EP 0597789 A1 | 05/18/1994 | H04L/12/46; |
| European Patent Publication No. EP 0785698 A2 | 07/23/1997 | H04Q/11/04; |
| International Patent Document No. WO 96/13922 | 05/09/1996 | H04L/12/44; |
| International Patent Document No. WO 96/21302 | 07/11/1996 | H04L/12/46; |
| International Patent Document No. WO 97/18657 | 05/22/1997 | H04L/12/18-- |

Hemant Kanakia and David R. Cheriton, "The VMP Network Adapter Board (NAB): High-Performance Network Communication for Multiprocessors," Computer Communications Review, vol. 18, no. 4, pp. 175-187, 1988.;

William Stallings, "Internetworking: A Guide for the Perplexed," Telecommunications, North American Edition, Sept. 1989, pp. 25-30.;

Bob Stewart and Bill Hawe, "Local Area Network Applications," Telecommunications, North American Edition, Sept. 1984, pp. 96f-96j, and 96u.;

Bob Stewart, Bill Hawe, and Alan Kirby, "Local Area Network Connection," Telecommunications, North American Edition, Sept. 1984, pp. 54-55,58-59 and 66.;

National Semiconductor, databook, "DP83934 SONICTM-T Systems-Oriented Network Interface Controller with Twisted Pair Interface" pp. 1-457 to 1-458, 1-468 to 1-477, 1-480, 1-512, 1-527 to 1-529.;

NEC Data Sheet, MOS Integrated Circuit PD4516421, 4516821, 4516161 16M-bit Synchronous DRAM, November 1995.;

Printout of internet website http://www.ti.com/sc/docs/network/tswitch/product.htm#3150al,ThunderSWITCH Product Information, "ThunderSWITCH Product Descriptions," February 1997.;

UNITED STATES PATENT AND TRADEMARK OFFICE
CERTIFICATE OF CORRECTION

PATENT NO. : 6,252,879 B1
APPLICATION NO. : 09/078412
DATED : June 26, 2001
INVENTOR(S) : Zhang It is certified that error appears in the above-identified patent and that said Letters Patent is hereby corrected as shown below:

On Title Page
[ITEM 56]

Please add (cont'd)

Texas Instruments Product Preview SPWS027, "TNETX3150 ThunderSWITCH™ 15-Port 10-/100-MBIT/S Ethernet™ Switch," pp. 1-85, September 1996.--

Signed and Sealed this

Sixth Day of November, 2007

JON W. DUDAS
*Director of the United States Patent and Trademark Office*